United States Patent
Sun et al.

(10) Patent No.: US 11,320,557 B2
(45) Date of Patent: May 3, 2022

(54) POST-STACK TIME DOMAIN IMAGE WITH BROADENED SPECTRUM

(71) Applicant: Saudi Arabian Oil Company, Dhahran (SA)

(72) Inventors: Yimin Sun, The Hague (NL); Woodon Jeong, Dhahran (SA); Constantinos Tsingas, Dhahran (SA)

(73) Assignee: Saudi Arabian Oil Company, Dhahran (SA)

( * ) Notice: Subject to any disclaimer, the term of this patent is extended or adjusted under 35 U.S.C. 154(b) by 226 days.

(21) Appl. No.: 16/834,167

(22) Filed: Mar. 30, 2020

(65) Prior Publication Data

US 2021/0302611 A1    Sep. 30, 2021

(51) Int. Cl.
*G01V 1/36*    (2006.01)
*G01V 1/00*    (2006.01)

(52) U.S. Cl.
CPC ............. *G01V 1/362* (2013.01); *G01V 1/005* (2013.01); *G01V 2210/22* (2013.01)

(58) Field of Classification Search
CPC .......... G01V 1/362; G01V 1/005; G01V 1/28; G01V 2210/514; G01V 2210/22
See application file for complete search history.

(56) References Cited

U.S. PATENT DOCUMENTS

| 493,339 A | 3/1893 | Phillips |
|---|---|---|
| 1,028,012 A | 5/1912 | Foster |

(Continued)

FOREIGN PATENT DOCUMENTS

| CN | 101581223 | 11/2009 |
|---|---|---|
| CN | 103675899 | 3/2014 |

(Continued)

OTHER PUBLICATIONS

PCT International Search Report and Written Opinion in International Appln. No. PCT/US2021/024167, dated Jun. 21, 2021, 15 pages.

(Continued)

*Primary Examiner* — Elias Desta
(74) *Attorney, Agent, or Firm* — Fish & Richardson P.C.

(57) ABSTRACT

A computer system receives a post-stack time-domain image having a first spectrum and representing one or more subsurface structures. The computer system reconstructs an increased-frequency version of the post-stack time-domain image using L0-constrained inversion and a least-squares mismatch ratio. The increased-frequency version of the post-stack time-domain image includes structural artifacts. The computer system removes the structural artifacts from the increased-frequency version of the post-stack time-domain image using singular value decomposition. The computer system combines the increased-frequency version of the post-stack time-domain image with the post-stack time-domain image using a weighting function. The computer system generates a combined version of the increased-frequency version of the post-stack time-domain image and the post-stack time-domain image. The combined version represents the one or more subsurface structures and has a second spectrum broader than the first spectrum.

20 Claims, 22 Drawing Sheets

(56) References Cited

U.S. PATENT DOCUMENTS

| | | | |
|---|---|---|---|
| 3,441,631 A | 4/1969 | Fernald et al. | |
| 3,502,741 A | 3/1970 | Fernald et al. | |
| 3,688,249 A | 8/1972 | Backus et al. | |
| 3,691,529 A | 9/1972 | Pizante | |
| 4,449,208 A | 5/1984 | Moeckel et al. | |
| 4,562,540 A | 12/1985 | Devaney | |
| 4,935,904 A | 6/1990 | Chambers et al. | |
| 4,992,995 A | 2/1991 | Favret | |
| 5,292,837 A | 3/1994 | Heinrich et al. | |
| 6,311,133 B1* | 10/2001 | Lailly | G01V 1/301 702/18 |
| 6,317,695 B1* | 11/2001 | Zhou | G01V 1/28 702/16 |
| 6,651,007 B2 | 11/2003 | Ozbek | |
| 6,767,975 B1 | 7/2004 | Liu | |
| 6,836,448 B2 | 12/2004 | Robertsson et al. | |
| 7,085,195 B2 | 8/2006 | Taner et al. | |
| 7,157,532 B2 | 1/2007 | Payer et al. | |
| 7,196,969 B1 | 3/2007 | Karazincir | |
| 7,373,252 B2 | 5/2008 | Sherrill et al. | |
| 7,643,377 B1 | 1/2010 | Uzes | |
| 7,953,556 B2 | 3/2011 | Craft et al. | |
| 8,040,754 B1 | 10/2011 | Hardage | |
| 8,116,168 B1 | 2/2012 | Luo et al. | |
| 8,227,653 B2 | 7/2012 | Weber et al. | |
| 8,437,998 B2 | 5/2013 | Routh et al. | |
| 8,542,554 B2 | 9/2013 | Thomson | |
| 8,619,498 B2 | 12/2013 | Xu et al. | |
| 8,681,581 B2 | 3/2014 | Moldoveanu et al. | |
| 8,694,299 B2 | 4/2014 | Krebs et al. | |
| 8,699,297 B2 | 4/2014 | Ozdemir et al. | |
| 8,879,355 B2 | 11/2014 | Soubaras et al. | |
| 8,948,463 B2 | 2/2015 | Landa et al. | |
| 9,081,111 B2 | 7/2015 | Amundsen et al. | |
| 9,116,255 B2 | 8/2015 | Eick et al. | |
| 9,128,205 B2 | 9/2015 | Guan et al. | |
| 9,188,693 B2 | 11/2015 | Monk et al. | |
| 9,244,181 B2 | 1/2016 | Rickett et al. | |
| 9,268,047 B2* | 2/2016 | Hargreaves | E21B 49/00 |
| 9,329,293 B2 | 5/2016 | Parkes et al. | |
| 9,470,811 B2 | 10/2016 | Sun et al. | |
| 9,536,143 B2 | 1/2017 | Jiang et al. | |
| 9,568,627 B2 | 2/2017 | Guigne et al. | |
| 9,702,997 B2 | 7/2017 | Sava et al. | |
| 9,702,998 B2 | 7/2017 | Bansal | |
| 9,724,681 B2 | 8/2017 | Lucciulli et al. | |
| 9,726,771 B1 | 8/2017 | Popovici et al. | |
| 9,753,166 B2 | 9/2017 | Bale | |
| 9,791,580 B2 | 10/2017 | Asgedom et al. | |
| 9,880,303 B2 | 1/2018 | Landa et al. | |
| 9,896,392 B2 | 2/2018 | Meiswinkel et al. | |
| 9,919,298 B2 | 3/2018 | Schmidt et al. | |
| 9,921,325 B2 | 3/2018 | Hegna et al. | |
| 10,022,698 B2 | 7/2018 | Shaik et al. | |
| 10,054,714 B2 | 8/2018 | Denli et al. | |
| 10,156,648 B1 | 12/2018 | Jiang | |
| 10,232,339 B2 | 3/2019 | Bischof et al. | |
| 10,280,125 B2 | 5/2019 | Sogo et al. | |
| 10,310,122 B2 | 6/2019 | Haacke et al. | |
| 10,324,204 B1 | 6/2019 | Sturzu et al. | |
| 2007/0258323 A1 | 11/2007 | An | |
| 2008/0137476 A1 | 6/2008 | Eick et al. | |
| 2008/0221801 A1 | 9/2008 | Craft et al. | |
| 2010/0097888 A1 | 4/2010 | Neelamani et al. | |
| 2010/0131205 A1 | 5/2010 | Berkovitch et al. | |
| 2010/0171740 A1 | 7/2010 | Andersen | |
| 2011/0090760 A1 | 4/2011 | Peng et al. | |
| 2011/0276273 A1 | 11/2011 | Artman et al. | |
| 2012/0026833 A1 | 2/2012 | Soubaras et al. | |
| 2012/0029827 A1 | 2/2012 | Pepper et al. | |
| 2012/0051176 A1 | 3/2012 | Liu | |
| 2012/0075954 A1 | 3/2012 | Xu et al. | |
| 2012/0221248 A1 | 8/2012 | Yarman et al. | |
| 2012/0250460 A1 | 10/2012 | Edme et al. | |
| 2013/0060476 A1 | 3/2013 | Thomson | |
| 2013/0088939 A1 | 4/2013 | Edme et al. | |
| 2013/0163379 A1 | 6/2013 | Poole | |
| 2013/0176819 A1 | 7/2013 | Poole | |
| 2013/0258809 A1 | 10/2013 | Cotton et al. | |
| 2013/0294196 A1 | 11/2013 | Childs | |
| 2013/0311149 A1 | 11/2013 | Tang et al. | |
| 2014/0016436 A1 | 1/2014 | Sollner et al. | |
| 2014/0022860 A1 | 1/2014 | van Borselen et al. | |
| 2014/0032119 A1 | 1/2014 | Landa et al. | |
| 2014/0102694 A1 | 4/2014 | Hargreaves et al. | |
| 2014/0149046 A1 | 5/2014 | Baina et al. | |
| 2014/0200812 A1 | 7/2014 | Kitchenside | |
| 2014/0200816 A1 | 7/2014 | Peng et al. | |
| 2014/0269169 A1 | 9/2014 | van Borselen et al. | |
| 2014/0269182 A1 | 9/2014 | Parkes et al. | |
| 2014/0288842 A1 | 9/2014 | Maraschini | |
| 2014/0293744 A1 | 10/2014 | Zhang | |
| 2014/0301158 A1 | 10/2014 | Zhang et al. | |
| 2014/0328140 A1 | 11/2014 | Khalil et al. | |
| 2014/0365135 A1 | 12/2014 | Poole | |
| 2015/0012256 A1 | 1/2015 | Routh et al. | |
| 2015/0030210 A1 | 1/2015 | Matson | |
| 2015/0057938 A1 | 2/2015 | Krohn et al. | |
| 2015/0112601 A1 | 4/2015 | Ozbek | |
| 2015/0124559 A1 | 5/2015 | Cha et al. | |
| 2015/0170411 A1 | 6/2015 | Thomas | |
| 2015/0212222 A1 | 6/2015 | Poole | |
| 2015/0301209 A1 | 10/2015 | Yarman et al. | |
| 2015/0362610 A1 | 12/2015 | Frijlink et al. | |
| 2016/0131781 A1 | 5/2016 | Sun et al. | |
| 2016/0187507 A1 | 6/2016 | Brenders et al. | |
| 2016/0209534 A1 | 7/2016 | Behura | |
| 2016/0320506 A1 | 11/2016 | Almuhaidib | |
| 2016/0325274 A1 | 11/2016 | Schmidt | |
| 2016/0334526 A1 | 11/2016 | Pica | |
| 2016/0334527 A1 | 11/2016 | Xu | |
| 2016/0341837 A1 | 11/2016 | Eick | |
| 2016/0367977 A1 | 12/2016 | Shaikh et al. | |
| 2017/0010373 A1 | 1/2017 | Ayeni et al. | |
| 2017/0038490 A1 | 2/2017 | Hu | |
| 2017/0097428 A1 | 4/2017 | Sun | |
| 2017/0097432 A1 | 4/2017 | Poole | |
| 2017/0108602 A1 | 4/2017 | Yang et al. | |
| 2017/0197892 A1 | 7/2017 | Khawaji | |
| 2017/0199289 A1 | 7/2017 | Peng et al. | |
| 2017/0299746 A1 | 10/2017 | Hegna | |
| 2018/0003842 A1 | 1/2018 | Coates et al. | |
| 2018/0059276 A1 | 3/2018 | Roberts et al. | |
| 2018/0196154 A1 | 7/2018 | Gomes et al. | |
| 2019/0011585 A1 | 1/2019 | Sun et al. | |
| 2019/0092707 A1 | 3/2019 | Melibari et al. | |
| 2019/0187312 A1 | 6/2019 | Ramox et al. | |

FOREIGN PATENT DOCUMENTS

| | | |
|---|---|---|
| CN | 103675903 | 3/2014 |
| CN | 104122581 | 10/2014 |
| CN | 105954803 | 9/2016 |
| CN | 105974470 | 9/2016 |
| EP | 0109341 | 2/1991 |
| EP | 2108131 | 10/2009 |
| EP | 2624015 | 8/2013 |
| EP | 2909655 | 8/2015 |
| EP | 3029491 | 6/2016 |
| EP | 3264142 | 1/2018 |
| GB | 2483997 | 3/2012 |
| WO | WO 2005026776 | 3/2005 |
| WO | WO 2009018525 | 2/2009 |
| WO | WO 2010044918 | 4/2010 |
| WO | WO 2011154762 | 12/2011 |
| WO | WO 2012158456 | 11/2012 |
| WO | WO 2014004109 | 1/2014 |
| WO | WO 2014110330 | 7/2014 |
| WO | WO 2014134432 | 9/2014 |
| WO | WO 2014179282 | 11/2014 |
| WO | WO 2015066481 | 5/2015 |
| WO | WO 2015097557 | 7/2015 |
| WO | WO 2015164478 | 10/2015 |
| WO | WO 2015178789 | 11/2015 |

(56) References Cited

FOREIGN PATENT DOCUMENTS

| WO | WO 2016038458 | 3/2016 |
|---|---|---|
| WO | WO 2016156530 | 10/2016 |
| WO | WO 2017065632 | 4/2017 |

OTHER PUBLICATIONS

Bekara et al., "Local Singular Value Decomposition for Signal Enhancement OS Seismic Data," Geophysics, Society of Exploration Geophysicists, US, Mar. 2007, 72(2): V59-V65, 7 pages.

Alkhalifah, "Scattering Angle Based Filtering of the Waveform Inversion Gradients," Geophysical Journal International 200: 363-373, 2015, 11 pages.

Bahorich and Farmer, "3D Seismic Discontinuity for Faults and Stratigraphic Features: the Coherence Cube," The Leading Edge 14, 1995, 6 pages.

Barr and Sanders, "Attenuation of Water-Column Reverberations Using Pressure and Velocity Detectors in Water-Bottom Cable," SEG Expanded Abstracts from the 59th Annual International Meeting, Nov. 2, 1989, 4 pages.

Batany et al., "Adaptive multiple subtraction: Unification and Comparison of matching filters based on the lq-norm and statistical independence," Geophysics, 81:1 (V43-V54), Jan.-Feb. 2016, 13 pages.

Berkhout and Verschuur, "Estimation of multiple scattering by iterative inversion, Part I: Theoretical considerations," Geophysics 62:5 (1586-1595), Sep.-Oct. 1997, 10 pages.

Berkhout, "Review Paper: An outlook on the future of seismic imagining; Part III: Joint Mitigation Inversion," Geophysical Prospecting, 62: 950-971, 2014, 22 pages.

Birdus et al., "Successful application of joint reflection/refraction tomographic inversion in a shallow water marine environment," 23rd International Geophysical Conference and Exhibition, ASEG-PESA, Aug. 11-14, 2013, 4 pages.

Cai et al., "Three-dimensional refraction imagining," 64th Annual International Meeting, SEG, Oct. 23-28, 1994, 4 pages.

Cerveny, "Seismic ray theory," Cambridge University Press, Apr. 2000, 742 pages.

Chao-Ying et al., "P- and S-wavefield simulations using both the first- and second-order separated wave equations through a high-order staggered grid finite-difference method," Earthquake Science 26:2 (83-98), Nov. 2, 2013, 16 pages.

Chen and Fomel, "Random noise attenuation using local signal-and-noise orthogonalization," Geophysics 80:6 (WD1-WD9), 2015, 19 pages.

Chen and Fomel, "Random noise attenuation using local signal-and-noise orthogonalization," Geophysics, GEO-2014-0227-R2, Mar. 2015, 33 pages.

Chen et al., "Directly imaging steeply-dipping fault zones in geo-thermal fields with multicomponent seismic data," Geothermics 57, Sep. 1, 2015, 31 pages.

Chen et al., "Ground-Roll Noise Attenuation Using a Simple and Effective Approach Based on Local Band-Limited Orthogonalization," IEEE Geoscience and Remote Sensing Letters 12:11 (2316-2320), Nov. 2015, 5 pages.

Chen et al., "Multiples Attenuation using Trace Randomization and Empirical Mode Decomposition," SEG Technical Program expanded abstracts 4498-4502, 2016, 5 pages.

Chiu, "Coherent and random noise attenuation via multichannel singular spectrum analysis in the randomized domain: coherent and random noise attenuation in the randomized domain," Geophysical Prosecting 61:S1 (1-9), Jul. 19, 2012, 9 pages.

Craft and Paffenholz, "Geophone noise attenuation and wave-field separation using a multidimensional decomposition technique," 70th EAGE Conference and Exhibition, Extended Abstracts, Jun. 9, 2008, 5 pages.

Dai et al., "Multi-source least-squares reverse time migration," Geophysical Prospecting 60:4 (681-695), Mar. 2012, 15 pages.

Davydenko et al., "Full wavefield migration, using internal multiples for undershooting," SEG Technical Program Expanded Abstracts 2013, Sep. 1, 2013, 5 pages.

Dellinger and Etgen, "Wave-field separation in two-dimensional anisotropic media," Geophysics 55:7, Jul. 1990, 6 pages.

Denli and Huang, "Elastic-wave reverse-time migration with a wavefield-separation imaging condition," 78th Annual International Meeting, SEG, Expanded Abstracts, Nov. 9-14, 2008, 5 pages.

Donno et al., "Curvelet-based multiple prediction," Geophysics 75:6 (WB255-WB263), Nov.-Dec. 2010, 9 pages.

Donno, "Improving multiple removal using least-squares dip filters and independent component analysis," Geophysics 76:5 (V91-V104), Sep.-Oct. 2011, 14 pages.

Fei et al., "An Endemic Problem in Reverse-Time Migration," 84th Annual International Meeting, SEG, Expanded Abstracts, 3811-3815, 2014, 5 pages.

Fei et al., "Removing False Images in Reverse-Time Migration: The Concept of De-Primary," Geophysics 80:6 (S237-S244), Nov.-Dec. 2015, 8 pages.

Fletcher, "Suppressing Unwanted Internal Reflections in Prestack Reverse-Time Migration," Geophysics 71:6 (E79-E82), Nov.-Dec. 2006, 4 pages.

Fomel, "Shaping regularization in geophysical-estimation problems," Geophysics 72:2 (R29-R36), Mar.-Apr. 2007, 8 pages.

Fomel, "Theory of 3-D Angle Gathers in Wave-Equation Imaging," 74th Annual International Meeting, SEG, Expanded Abstracts, 1053-1056, Oct. 2004, 4 pages.

Forestiere et al., "Oligomerization of Monoolefins by Homogenous Catalysts", Oil & Science and Technology Review de l'Institute Francais du Petrole, 64:6 (663-664), Nov. 2009, 20 pages.

Gaiser, "Detector coupling corrections for vector infidelity of multicomponent OBC data," Geophysics 72:3, May-Jun. 2007, 11 pages.

Golikov et al., "Building near-surface models with velocity inversions and evaluating their impact on depth imaging," SEG Denver 2014 Annual Meeting, Oct. 26-31, 2014, 5 pages.

Guitton and Verschuur, "Adaptive subtraction of multiples using the L1-norm," Geophysical Prospecting 52:1(27-38), Jan. 2004, 12 pages.

Guitton, "Multiple attenuation in complex geology with a pattern-based approach," Geophysics 70:4 (V97-V107), Jul.-Aug. 2005, 11 pages.

Han, "Changeable frequency and phase of seismic data," EAGE, We A4 12, Paris, France, Jun. 12-15, 2017, 5 pages.

Hayashi et al., "Non-Uniqueness in Seismic Refraction Analysis," Symposium on the application of geophysics to Engineering and environmental problems, Apr. 10-14, 2011, 13 pages.

Hennenfent, "Sampling and Reconstruction of Seismic Wavefields in the Curvelet Domain," a Thesis Submitted in Partial Fulfillment of the Requirements for the Degree of Doctor of Philosophy in the Faculty of Graduate Studies (Geophysics), University of British Columbia, Apr. 1, 2008, 153 pages.

Herrmann et al., "Non-linear primary-multiple separation with directional curvelet frames," Geophysical Journal International 170:2 (781-799), Aug. 2007, 19 pages.

Horn et al., "Determining Optical Flow," Artificial Intelligence 17:1-3 (185-203), 1981, 19 pages.

Hu et al., "Angle Gathers from Reverse Time Migration using Analytic Wavefield Propagation and Decomposition in the Time Domain," Geophysics 81:1 (S1-S9), Jan.-Feb. 2016, 9 pages.

Jesus, "Sensor Array Optimization for Seismic Estimation via Structured Sparse Inversion," IEEE, 2018, 5 pages.

Khaidukov et al., "Diffraction imaging by focusing-defocusing: An outlook on seismic superresolution," Geophysics 69:6, Nov.-Dec. 2004, 13 pages.

Kim et al., "3D Least-Squares Reverse Time Migration Using Wavefield Decomposition via Hilbert transform," 79th EAGE Conference & Exhibition, Jun. 12, 2017, 5 pages.

Kim et al., "Estimated source wavelet-incorporated reverse-time migration with a virtual source imaging condition," Geophysical Prospecting 61:Suppl. 1 (317-333), Jan. 15, 2013, 17 pages.

(56) References Cited

OTHER PUBLICATIONS

Kim et al., "Increasing signal-to-noise ratio of marine seismic data: a case study from offshore Korea," Journal of Applied Geophysics 134: 136-145, Nov. 2016, 2 pages.

Klokov et al., "Separation and imaging of seismic diffractions using migrated dip-angle gathers," Geophysics 77:6 (S131-S143), Sep. 2012, 34 pages.

Kong et al., "Diffraction separation by plane-wave prediction filtering," Chinese Geophysical Society, Applied Geophysics 14:3 (399-405), Sep. 2017, 7 pages.

Landa et al., "Separation, imaging and velocity analysis of seismic diffractions using migrated dip-ante gathers," 78th Annual International Meeting, SEG, Expanded Abstracts, 2008, 5 pages.

Li and Lu, "Demultiple strategy combining Radon filtering and Radon domain adaptive multiple subtraction," Journal of Applied Geophysics 103: 1-11, Apr. 2014, 11 pages.

Liu and Lu, "Diffraction Imaging Based on Dip Angle Gather of Seismic Wave Equation Migration," Near Surface Geophysics Asia Pacific Conference, Beijing, China, Jul. 17-19, 2013, 4 pages.

Liu et al., "An Effective Imaging Condition for Reverse-Time Migration using Wavefield Decomposition," Geophysics 76:1 (S29-S39), Jan. 2011, 11 pages.

Liu et al., "Imaging diffractors using wave-equation migration," Geophysics 81:6, Nov.-Dec. 2016, 10 pages.

Liu et al., "Reverse time migration of internal multiples," Geophysics 80:5 (S175-S185), 83rd Annual International Meeting, SEG, Expanded Abstracts, Sep.-Oct. 2015, 11 pages.

Liu et al., "Reverse-Time Migration using One-Way Wavefield Imaging Condition," 77th Annual International Meeting, SEG Expanded Abstracts, 2170-2174, 2007, 1 page.

Luo et al., "Edge-preserving smoothing and applications," The Leading Edge 21, 2002, 5 pages.

Mahdaviani, et al, "Selective Ethylene Dimerization Toward 1-butene by a New Highly Efficient Catalyst System and Determination of Its Optimum Operating Conditions in a Buchi Reactor," International Journal of Chemical Engineering and Applications 1:3 (276-281), Oct. 2010, 6 pages.

Meunier, "Seismic acquisition from yesterday to tomorrow," Society of Exploration Geophysicists 14, 2011, 3 pages.

Nakayama and Blacquiere, "Blended-acquisition design," Delphi Consortium Meeting, Den Haag, TU Delft (Delft University of Technology), Jun. 6, 2018, 75 pages.

Nemeth et al., "Dynamic smoothing in cross-well tomography," 63rd Annual International Meeting, SEG, Sep. 26-30, 1993, 4 pages.

Nocedal and Wright, "Numerical optimization," Springer series in operations research and financial engineering, Jul. 27, 2006, 651 pages.

Nuber et al., "Optimizing measurement geometry for seismic near-surface full waveform inversion," Geophysical Journal International 210:3 (1909-1921), Sep. 1, 2017, 35 pages.

Poole "Pre-Migration Receiver De-Ghosting and Re-Datuming for Variable Depth Streamer Data," 2013 SEG Annual Meeting, Houston, 4216-4220, Aug. 19, 2013, 5 pages.

Popovici et al., "High resolution diffraction imaging of small scale fractures in shale and carbonate reservoirs," Unconventional Resources Technology Conference, 2015, 9 pages.

Qin et al., "Extraction of Geological Information from Seismic Data Contaminated by Coherent Noise," SPE-183830-MS, Society of Petroleum Engineers, presented at the SPE Middle East Oil and Gas Show and Conference, Mar. 6-9, 2017, 5 pages.

Qin et al., "Kirchhoff preSDM interactive dip-gather stacking and dip illumination panel generation," 75th Annual International Meeting, SEG, Expanded Abstracts, 2005, 5 pages.

Qin et al., "Finite difference solution of the eikonal equation along expanding wavefronts," Geophysics 57:3 (478-487), Mar. 1992, 10 pages.

Qin et al., "Inversion and imagining of refraction data," 63rd Annual International Meeting, SEG, Sep. 26-30, 1993, 3 pages.

Rickett et al., "P167—Adaptive multiple subtraction with non-stationary helical shaping filters," EAGE 63rd Conference and Technical Exhibition, Jun. 11-15, 2001, 4 pages.

Sava et al. "Angle-Domain Common Image Gathers by Wavefield Continuation Methods," Geophysics, 68:1065-1074, May-Jun. 2003, 10 pages.

Schoepp et al., "Multifocusing 3D diffraction imaging for detection of fractured zones in mudstone reservoirs: Case history," Interpretation 3:1, Feb. 2015, 12 pages.

Schuster et al., "Wavepath eikonal traveltime inversion: Theory," Geophysics 58:9 (13144323), Sep. 1993, 10 pages.

Shatilo et al., "Effect of Noise Suppression on Quality of 2C OBC Image," SEG Expanded Abstracts from the 74th Annual International Meeting, Oct. 10, 2004, 4 pages.

Soubaras, "Ocean bottom hydrophone and geophone processing," SEG Expanded Abstracts from the 66th Annual International Meeting, Nov. 10-15, 1996, 4 pages.

Spitz, "Pattern recognition, spatial predictability and subtraction of multiple events," the Leading Edge, Jan. 1999, 4 pages.

Staal, "Combined imaging and velocity estimation by Joint Migration Inversion," Thesis to obtain the degree of doctor at Delft University of Technology, Nov. 11, 2015, 125 pages.

Sturzu et al., "Diffraction imaging using specularity gathers," Journal Seismic Exploration 23, Feb. 2014, 18 pages.

Sun and Verschuur, "Three-dimensional receiver deghosting of seismic streamer data using L1 inversion and redundant extended radon dictionary," Geophysical Prospecting, EAGE, 2018, 17 pages.

Sun et al., "Comparative study of dip-angle domain Gaussian beam migration and Kirchhoff migration in diffraction separation," SEG Technical Program Expanded Abstracts, 2014, 5 pages.

Sun et al., "Separating P- and S-waves in prestack 3D elastic seismograms using divergence and curl," Geophysics 69:1, Jan.-Feb. 2004, 12 pages.

Taner et al., "Separation and imaging of seismic diffractions using plane-wave decomposition," SEG Technical Program Expanded Abstracts, 25(1), Jan. 2006.

Tang et al., "Tomographically Enhanced Full Waveform Inversion," 83rd Annual International Meeting, SEG, Expanded Abstracts 1037-1041, 2013, 5 pages.

Tarantola, "Inversion of seismic reflection data in acoustic approximation," Geophysics 49:8 (1259-1266), Aug. 1984, 8 pages.

Trad, "Latest Views of the Sparse Radon Transform," Geophysics 68:1 (386-399), Jan.-Feb. 2003, 14 pages.

Ventosa et al., "Adaptive multiple subtraction with wavelet-base complex urary Wiener filters," previously published in Geophysics 77: V183-V192, Nov.-Dec. 2012, Jun. 2, 2018, 18 pages.

Verschuur et al., "Adaptive surface-related multiple elimination," Geophysics 57:9 (1166-1177), Sep. 1992, 12 pages.

Verschuur et al., "Joint migration inversion: Simultaneous determination of velocity fields and depth images using all orders of scattering," The Leading Edge, 1037-1046, Dec. 2016, 10 pages.

Vidale, "Finite-difference calculation of travel times," Bulletin of the Seismological Society of America 78:6 (2062-2076), Dec. 1988, 15 pages.

Vrolijk et al., "Integrated receiver deghosting and closed-loop surface-multiple elimination," Geophysics 82:4 (T133-T141), Jul.-Aug. 2017, 9 pages.

Vrolijk et al., "Shot-based deghosting for variable sea surface and receiver depth," SEG Technical Program Expanded Abstracts, SEG International Exposition and 87th Annual Meeting, Aug. 17, 2017, 6 pages.

Wang et al., "Comparison of two algorithms for isotropic elastic P and S vector decomposition," Geophysics 80:4, Jul.-Aug. 2015, 15 pages.

Wang et al., "RTM Artifact Removal via a Fast Algorithm for Wavefield Decomposition," 2016 SEG International Exposition and 86th Annual Meeting, 2016, 1 page.

Wang et al., "Taking Advantage of Wave Field Decomposition in Full Waveform Inversion," presented at the 75th EAGE Conference & Exhibition incorporating Spe Europec 2013, Extended Abstracts, Tu-07-08, Jun. 2013, 5 pages.

Wang et al., "Up/down and P/S decompositions of elastic wavefields using complex seismic traces with applications to calculations

(56) References Cited

OTHER PUBLICATIONS

Poynting vectors and angle-domain common-image gathers from reverse time migrations," Geophysics 81:4, Jul. 1, 2016, 15 pages.
Wang, "Multichannel matching pursuit for seismic trace decomposition," Geophysics 75:4 (V61-V66), Jul.-Aug. 2010, 6 pages.
Wang, "Multiple subtraction using an expanded multichannel matching filter," Geophysics 68:1 (346-354), Jan.-Feb. 2003, 9 pages.
Weglein et al., "An Inverse-Scattering Series Method for Attenuating Multiples in Seismic Reflection Data," Geophysics 62:6 (1975-1989), Nov.-Dec. 1997, 15 pages.
Whitmore, "A Generalization of RTM Inverse Scattering Imaging Conditions," 75th EAGE Conference and Exhibition incorporating SPE EUROPEC, Jun. 10-13, 2013, 5 pages.
Wiggins, "Multiple attenuation by explicit wave extrapolation to an interpreted horizon," the Leading Edge, Jan. 1999, 7 pages.
Woodward, "Wave-equation tomography," Geophysics 57:1 (15-26), Jan. 1992, 12 pages.
Wu et al., "Automated target oriented acquisition design in marine environment," Den Haag, Delphi Consortium, Delft University of Technology, Jun. 2018, 80 pages.
Xiao and Leaney, "Local vertical seismic profiling (VSP) elastic reverse-time migration and migration resolution: Salt-flank imaging with transmitted P-to-S waves," Geophysics 75:2, Mar.-Apr. 2010, 15 pages.
Xie, "An Angle-Domain Wavenumber Filter for Multi-Scale Full-Waveform Inversion," 85th Annual International Meeting, SEG, Expanded Abstracts 1132-1137, 2015, 6 pages.
Xu et al., "3D Angle Gathers from Reverse-Time Migration," Geophysics 76:2 (S77-S92), Mar.-Apr. 2011, 16 pages.
Xue et al., "Amplitude-preserving nonlinear adaptive multiple attenuation using the high order sparse Radon Transform," Sinopec Geophysical Research Institute, IOP Science, Journal of Geophysics and Engineering 31:3, Apr. 2016, 2 pages.
Yan and Dickens, "Reverse time migration angle gathers using Poynting vectors," Geophysics 81:6, Nov.-Dec. 2016, 12 pages.
Yao et al., "Least-squares reverse-time migration for reflectivity imaging," Science China Earth Sciences 58:11 (1982-1992), Nov. 30, 2015, 11 pages.
Yuan, "Analysis of four-component seafloor seismic data for seismic anisotropy", Thesis for degree of Doctor of Philosophy, University of Edinburgh, Department of Geology and Geophysics, Jan. 2001, 5 pages, Abstract Only.
Zhang and McMechan, "2D and 3D elastic wavefield vector decomposition in the wavenumber domain for VTI media," Geophysics 75:3 (D13-D26), May-Jun. 2010, 14 pages.
Zhang and Zhang, "Diffraction imaging using shot and opening angle gathers: A prestack time migration approach," Geophysics 79:2 (S23-S33), Mar.-Apr. 2014, 11 pages.
Zhang et al, "Improving reverse time migration angle gathers by efficient wavefield separation," Geophysics 83:2 (S187-S195), Mar. 1, 2018, 9 pages.
Zhang et al, "RTM angle gathers by optical flow with wavefield separation," SEG Technical Program Expanded Abstracts, SEG International Exposition and 88th Annual Meeting, Aug. 27, 2018, 5 pages.
Zhang et al., "Amplitude-Preserving Reverse Time Migration: From Reflectivity to Velocity and Impedance Inversion," Geophysics 79:6 (S271-S283), Nov.-Dec. 2014, 13 pages.
Zhang et al., "Double parameters full-waveform inversion for velocity and density in the time domain," presented at the International Geophysical Conference, CPS/SEG International Geophysical Conference, The Society of Exploration Geophysicists and the Chinese Petroleum Society, Apr. 24-27, 2018, 4 pages.
Zhang et al., "Efficient Wave-Equation-Based Diffraction Imagining," Geophysics 82:5, Sep.-Oct. 2019, 11 pages.
Zhang et al., "Nonlinear refraction traveltime tomography," Geophysics 63:5 (1726-1737), Sep.-Oct. 1998, 12 pages.
Zhang, "RTM Angle Gathers and Specular Filter (SF) RTM using Optical Flow," 84rd Annual International Meeting, SEG Denver Annual Meeting, SEG Expanded Abstracts, 3816-3820, 2014, 5 pages.
Zhu et al., "Elastic imagining and time-lapse migration based upon adjoint methods," Geophysics 74:6 (WCA167-WCA177), Nov.-Dec. 2009, 11 pages.
Zhu et al., "Estimation of near-surface velocities by tomography," SEG 58th Annual International Meeting, Oct. 30-Nov. 3, 1988, 3 pages.

* cited by examiner

POST-STACK TIME DOMAIN IMAGE WITH BROADENED SPECTRUM

TECHNICAL FIELD

This description relates generally to hydrocarbon reservoirs, for example, to seismic exploration of a hydrocarbon reservoir by broadening a spectrum of a post-stack time domain image.

BACKGROUND

Seismic exploration of hydrocarbon reservoirs using geophysical prospecting poses challenges. For example, traditional methods for enhancing the bandwidth of seismic images without the physical acquisition of high-frequency data are sometimes inadequate, thus increasing the time and cost of seismic exploration.

SUMMARY

The implementations disclosed include methods, apparatus, and systems for broadening a spectrum of a post-stack time domain image. A computer system receives a post-stack time-domain image having a first spectrum and representing one or more subsurface structures. The computer system reconstructs an increased-frequency version of the post-stack time-domain image using L0-constrained inversion and a least-squares mismatch ratio. The increased-frequency version of the post-stack time-domain image includes structural artifacts. The computer system removes the structural artifacts from the increased-frequency version of the post-stack time-domain image using singular value decomposition (SVD). The computer system combines the increased-frequency version of the post-stack time-domain image with the post-stack time-domain image using a weighting function. The computer system generates a combined version of the increased-frequency version of the post-stack time-domain image and the post-stack time-domain image. The combined version represents the one or more subsurface structures and has a second spectrum broader than the first spectrum.

In some implementations, the L0-constrained inversion is based on a dictionary including phase-rotated wavelets.

In some implementations, the phase-rotated wavelets are derived from a Ricker wavelet and a Klauder wavelet.

In some implementations, the reconstructing of the increased-frequency version includes performing, by the computer system, the L0-constrained inversion using a greedy algorithm.

In some implementations, prior to reconstructing the increased-frequency version of the post-stack time-domain image, the computer system removes jitters from the post-stack time-domain image using SVD.

In some implementations, the post-stack time-domain image includes multiple traces and reconstructing the increased-frequency version of the post-stack time-domain image includes grouping each trace with neighboring traces of the trace into a trace group. The computer system selects an atom associated with a decrease in a residual of the group trace to provide the increased-frequency version of the post-stack time-domain image.

In some implementations, the computer system subtracts a contribution of the atom from each trace of the trace group.

DETAILED DESCRIPTION

The implementations disclosed provide methods, apparatus, and systems for broadening a spectrum of a post-stack time domain image. Among other benefits and advantages, the image generated using the disclosed implementations carries a broadened spectrum and also preserves all the original subsurface structures of the input post-stack image. The noise, structural jitters, and artifacts present in the input post-stack time domain image obtained using field data are removed to improve image quality. The implementations simultaneously address the challenges of structure preservation, jitter removal, artifacts removal, dictionary selection, and inversion efficiency. The implementations broaden the bandwidth of post-stack images without the need for physically acquiring high-frequency field data, thus improving the quality and efficiency of seismic interpretation and seismic exploration.

Figure 1:
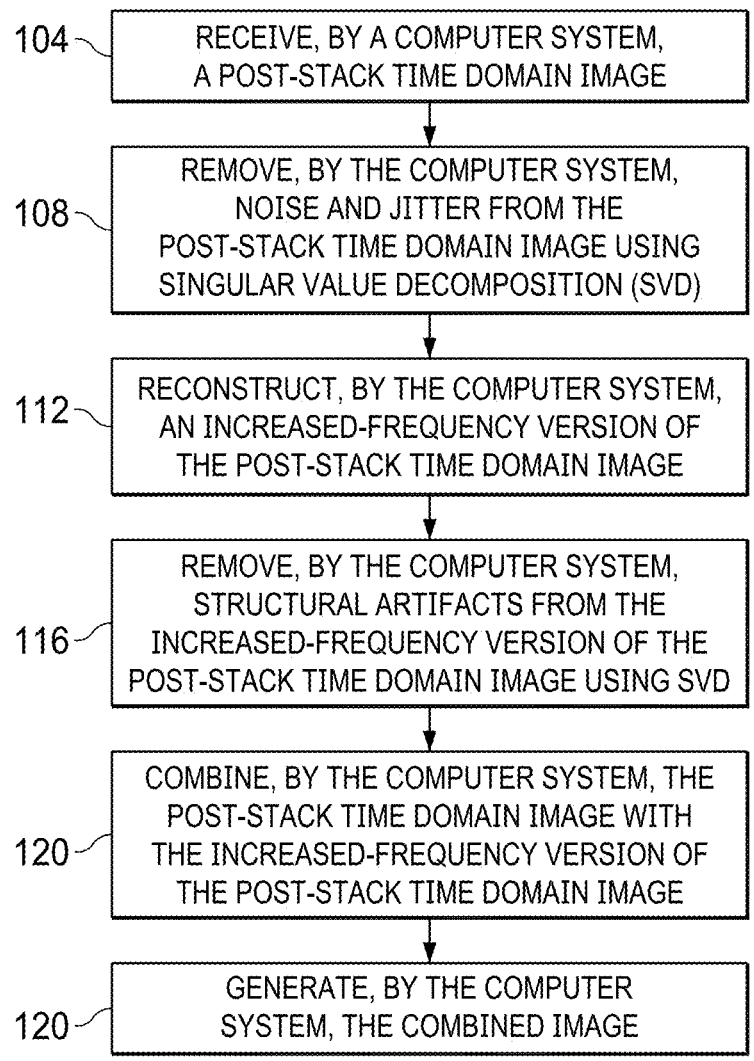
FIG. 1 illustrates a process for broadening a spectrum of a post-stack time domain image.

FIG. 1 illustrates a process for broadening a spectrum of a post-stack time domain image. The spectrum of the post-stack time domain image refers to the temporal-frequency spectrum of the post-stack time-domain image or the components of the post-stack time-domain image represented in the temporal-frequency domain. A stack refers to a processed seismic image including seismic traces from one or more seismic surveys after the pre-stack gathers have been processed and stacked to reduce noise and improve the overall data quality. A post-stack time domain image refers to a resulting seismic image recorded in the time domain after the stacking process. In some implementations, the process is performed by a computer system, such as the computer system described in more detail with reference to FIG. 24. The implementations disclosed here address geophysical prospecting, specifically enhancing a bandwidth of a post-stack time domain image without physically acquiring high-frequency data. For onshore data, the "high-frequency data" refers to data having frequency components greater than 40 Hz. For offshore data, high-frequency data refers to data having frequency components greater than 60 Hz. The implementations solve an inverse problem to perform the bandwidth enhancement. For the post-stack time domain image, each trace is in accordance with the linear convolutional model expressed in equation (1).

$$S = \sum_{k=1}^{n} W_k R_k \qquad (1)$$

Here S denotes a vector representing the trace of interest, the series $\{W_k\}$ denote convolution matrices built using atoms from a certain input wavelet dictionary, and the series $\{R_k\}$ denote vectors including impulse responses of the trace corresponding to the convolution matrix series $\{W_k\}$. A wavelet dictionary can contain many different wavelets, and each wavelet in the dictionary is referred to as an "atom."

The computer system retrieves the series $\{R_k\}$ from equation (1) using the input trace S. If the series $\{R_k\}$ in equation (1) is retrieved, using a different wavelet atom to build the series $\{W_k\}$, the computer system can rebuild a different trace using equation (1). The generated trace has a different spectrum compared to that of the original input trace S. If this different wavelet atom contains frequency components greater than those in the original trace, then the computer system generates a trace having an increased resolution corresponding to the input trace S.

In step 104, the computer system receives a post-stack time-domain image. The post-stack time-domain image has a first spectrum. The first spectrum refers to the frequency spectrum of the post-stack time-domain image or the components of the post-stack time-domain image represented in the frequency domain. The post-stack time-domain image represents one or more subsurface structures.

In step 108, the computer system removes noise and jitters from the post-stack time domain image using the singular value decomposition (SVD). The SVD is a factorization of a real or complex matrix that generalizes the eigendecomposition of a square normal matrix to any m×n matrix via an extension of the polar decomposition. SVD decomposes an input image M of size m×n into three different matrices as shown in expression (2).

$$M = U\Sigma V^H \qquad (2)$$

Here, U denotes the first matrix, an m×m matrix. Σ denotes the second matrix, an m×n a rectangular diagonal matrix. V denotes the third matrix, an a n×n matrix, and $V^H$ represents the complex conjugate of the V matrix. Based upon a preset threshold value, the input image can be approximately reconstructed by keeping only several leading terms of the diagonal values in Σ. Thus, SVD can be used to reduce noise in seismic images. The post-stack time domain image from field data can be contaminated by noise. The noise can introduce structural jitters and artifacts. Structural artifacts refer to unintended and spurious signals and data points in the post-stack time domain image that can result from the type of measuring instrumentation or data processing used. The jitters are removed from the post-stack time-domain image using SVD prior to reconstructing an increased-frequency version of the post-stack time-domain image. The post-stack time domain image used in Step 108 has a first dominant frequency, for example, 15 Hz. The increased-frequency version of the post-stack time-domain image refers to an image reconstructed by equation (1) using an increased-frequency atom (for example, a dominant frequency of 30 Hz).

In step 112, the computer system reconstructs an increased-frequency version of the post-stack time domain image. In some implementations, the series $\{W_k\}$ is built from a redundant dictionary. The linear convolutional model (equation (1)) can be under-determined in inversion for the series $\{R_k\}$. As a result, the computer system constrains the solution $\{R_k\}$. In some implementations, the computer system reconstructs the increased-frequency version of the post-stack time-domain image using L0-constrained inversion and a least-squares mismatch ratio. L0-constrained inversion refers to the fact that the regularization term in the inversion performed is based upon the L0 norm, $\|x\|_0$. For example, given an input post-stack time domain image, the computer system reconstructs a corresponding increased-frequency image via an L0-constrained inversion scheme.

In some implementations, the L0-constrained inversion is based on a dictionary comprising phase-rotated wavelets. For example, a mathematical dictionary used in the inversion scheme can include phase-rotated wavelets. In some implementations, the phase-rotated wavelets are derived from a Ricker wavelet and a Klauder wavelet. For example, the mother wavelets can include a Ricker wavelet and a Klauder wavelet. A solver for the L0-constrained inversion can use a greedy algorithm.

In some implementations, the computer system sets a least-squares mismatch ratio $\varepsilon_1$ to reconstruct the increased-frequency version of the post-stack time domain image using singular values from large to small. Linear least squares refers to a least squares approximation of linear functions to data. In the implementations disclosed, the least-squares mismatch ratio ci refers to the fact that an approximated solution $A_p$ is determined, such that $\|A - A_p\|_2 \leq \|A\|_2 * \varepsilon_1$. For example, the reconstruction process can be expressed by equations (3)-(7).

$$A = U\Sigma V^H \qquad (3)$$

Here, A denotes the input post-stack time domain image, and is a rectangular matrix of size m×n. U denotes an m×m unitary matrix, and its column vectors $u_i$ are the left eigenvectors of A.

$$\sigma_i = [\Sigma]_{i,i}, \sigma_1 \geq \sigma_2 \geq \ldots \geq \sigma_s \geq 0, s = \min\{m,n\} \quad (4)$$

Here, $\Sigma$ denotes an m×n rectangular diagonal matrix with non-negative elements $\sigma_i$, V denotes an n×n unitary matrix whose column vectors $v_i$ are the right eigenvectors of A, and $V^H$ represents the complex conjugate of the V matrix.

$$A = I_1 + I_2 + \ldots + I_n \quad (5)$$

$$I_i = \sigma_i u_i v_i^H \quad (6)$$

$$\underset{k \in [1,n]}{\operatorname{argmin}} \left\| \sum_{i=1}^{k} I_k - A \right\|_2 < \varepsilon_1 \cdot \|A\|_2 \quad (7)$$

The number k is searched in order to reconstruct the input post-stack time domain image using equation (6), such that a difference between the input post-stack time domain image and the reconstructed image is less than a user-defined threshold: $\varepsilon_1 \cdot \|A\|_2$. The SVD procedure is used twice in the process illustrated in FIG. 1. The SVD procedure is first used in step 108 to remove noise in the input post-stack time domain image. The increased-frequency version of the post-stack time-domain image can include structural artifacts. The SVD procedure is used for a second time in step 116 to remove structural artifacts generated in the reconstruction of the increased-frequency image.

In step 116, the computer system removes the structural artifacts from the increased-frequency version of the post-stack time domain image using SVD. In step 120, the computer system combines the post-stack time domain image with the increased-frequency version of the post-stack time domain image. In some implementations, the computer system combines the increased-frequency version of the post-stack time-domain image with the post-stack time-domain image using a weighting function. Example weighting functions for a seismic trace in the frequency domain are illustrated and described in more detail with reference to FIGS. 2C and 3C.

In step 124, the computer system generates the combined image. In some implementations, the computer system generates a combined version of the increased-frequency version of the post-stack time-domain image and the post-stack time-domain image. The combined version represents the one or more subsurface structures and has a second spectrum broader than the first spectrum. The second spectrum refers to the frequency spectrum of the combined image or the components of the combined image represented in the frequency domain. In some implementations, the combined version is generated or displayed on a display device of the computer system, such as the display device described in more detail with reference to FIG. 24. Based on equation (1), the computer system addresses several practical challenges to broaden the first spectrum of the post-stack time domain image. For example, lateral structures exist in the post-stack time domain image. However, equation (1) can disregard the spatial coherence among neighboring traces. Thus, the computer system performs structure preservation.

Figure 2A:
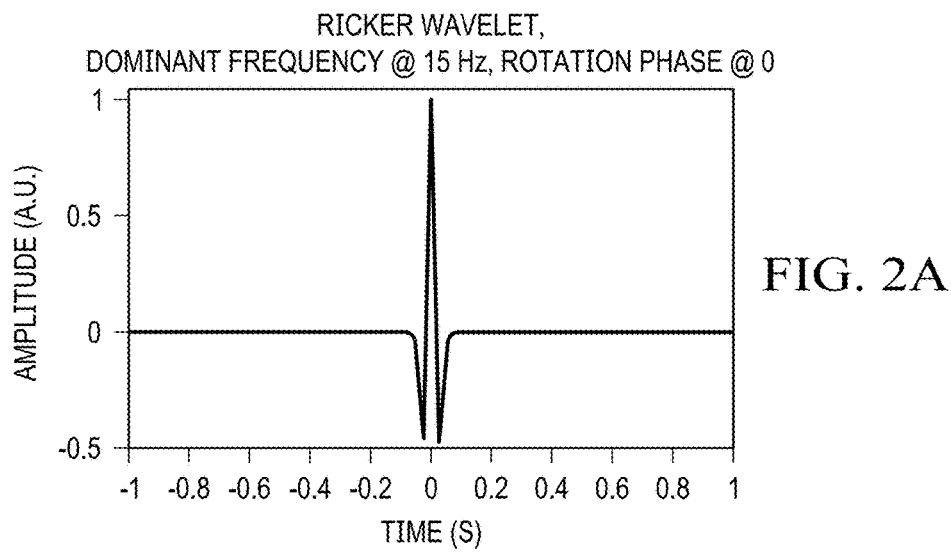
FIG. 2A illustrates a seismic trace.
Figure 2B:
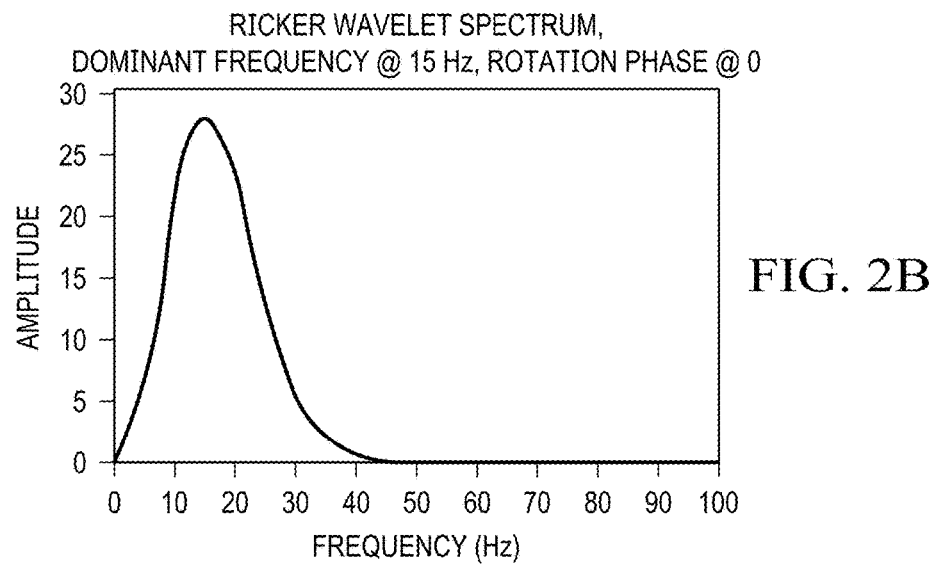
FIG. 2B illustrates a spectra of a seismic trace.
Figure 2C:
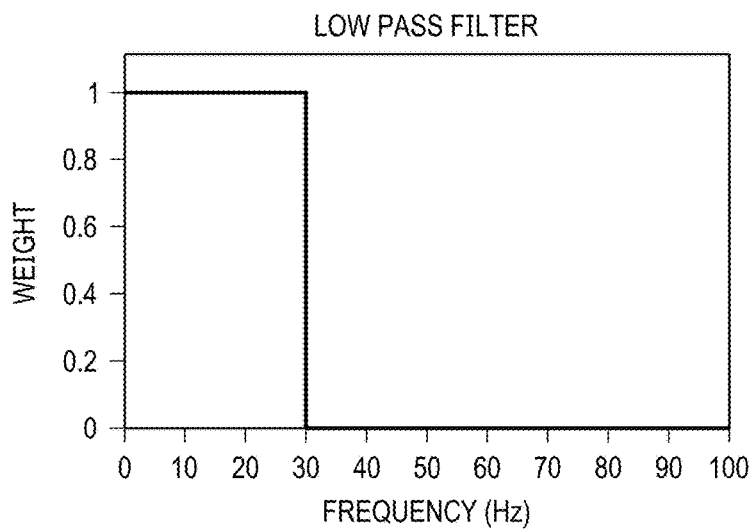
FIG. 2C illustrates a weighting function of a seismic trace in the frequency domain.

FIG. 2A illustrates a seismic trace. The computer system can use multiple ways to combine the input post-stack time domain image with the reconstructed increased-frequency post-stack time domain image to generate the output broadband image. In some implementations, the combining is performed using weighted summation in the frequency domain. FIG. 2A shows a trace of the input post-stack time domain image. The trace shown in FIG. 2A is a Ricker wavelet having a dominant frequency of 15 Hz. FIG. 2B illustrates a spectra of a seismic trace. The spectra of the trace of FIG. 2A is shown in FIG. 2B. FIG. 2C illustrates a weighting function of a seismic trace in the frequency domain. The weighting is performed by multiplying a weight function by the corresponding spectrum of the image to yield a weighted image. Summing two weighted images, one from the original post-stack image and the other from the increased-frequency image, yields the final bandwidth-broadened image. The weighting function in the frequency domain of the trace in FIG. 2A is shown in FIG. 2C. For the trace in FIG. 2A, the weighting function is a low-pass filter having 30 Hz as the maximum frequency. The weighting function in FIG. 2C is a filter that passes signals with a frequency lower than a selected cutoff frequency (for example, 30 Hz) and attenuates signals with frequencies higher than the cutoff frequency. The frequency response of the filter can be adjusted.

Figure 3A:
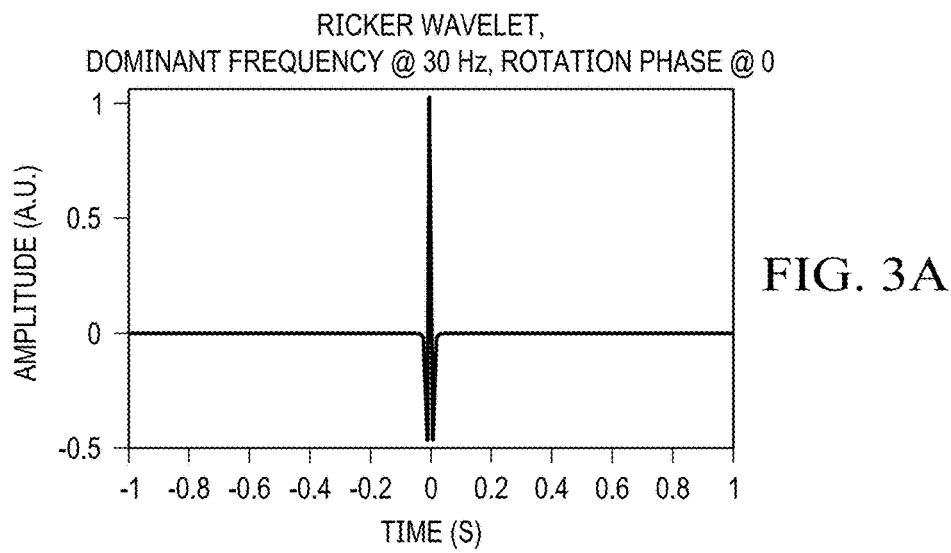
FIG. 3A illustrates a seismic trace.
Figure 3B:
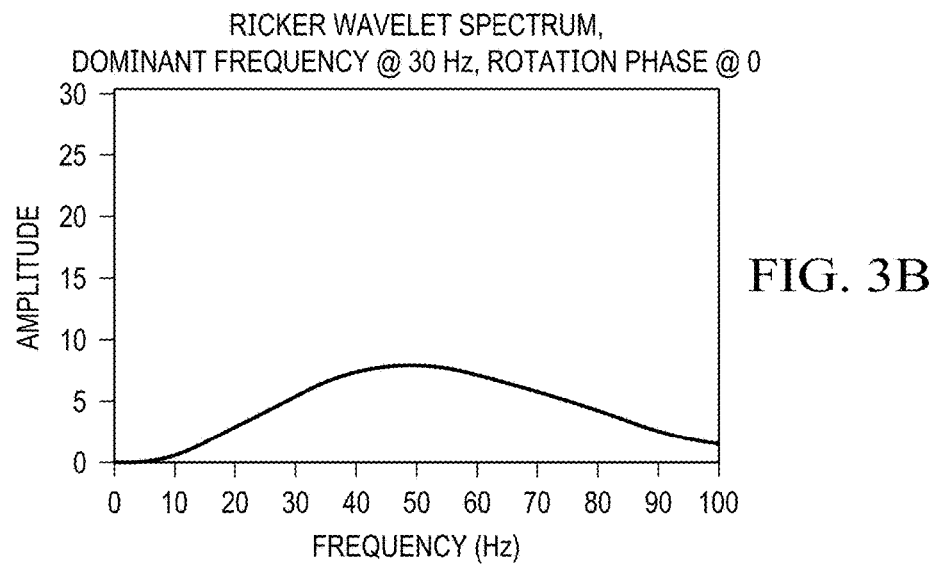
FIG. 3B illustrates a spectra of a seismic trace.
Figure 3C:
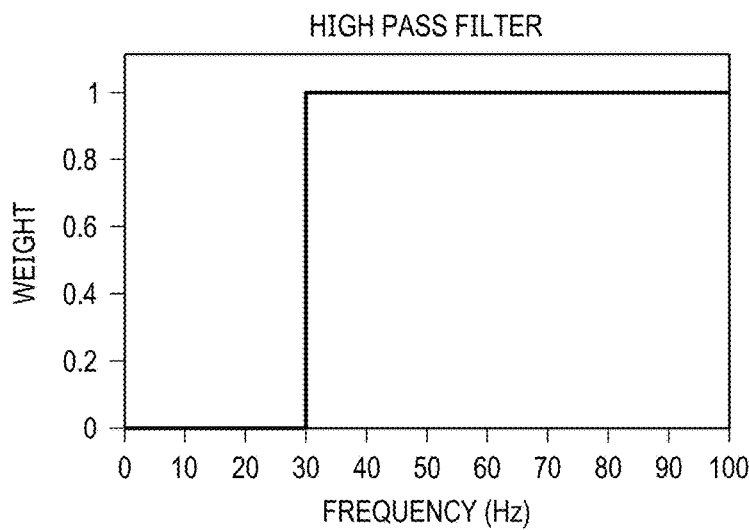
FIG. 3C illustrates a weighting function of a seismic trace in the frequency domain.

FIG. 3A illustrates a seismic trace. FIG. 3A shows a corresponding reconstructed increased-frequency trace (from FIG. 2A). The trace shown in FIG. 3A is a Ricker wavelet having a dominant frequency of 30 Hz. FIG. 3B illustrates a spectra of a seismic trace. The spectra of the trace in FIG. 3A is shown in FIG. 3B. FIG. 3C illustrates a weighting function of a seismic trace in the frequency domain. The weighting function in the frequency domain of the trace in FIG. 3A is shown in FIG. 3C. For the trace in FIG. 3A, the weighting function is a high-pass filter with 30 Hz as the minimum frequency. The weighting function in FIG. 3C is a filter that passes signals with a frequency higher than a certain cutoff frequency (for example, 30 Hz) and attenuates signals with frequencies lower than the cutoff frequency. The amount of attenuation for each frequency can be adjusted. The weighting function can be modeled as a linear time-invariant system.

Figure 4A:
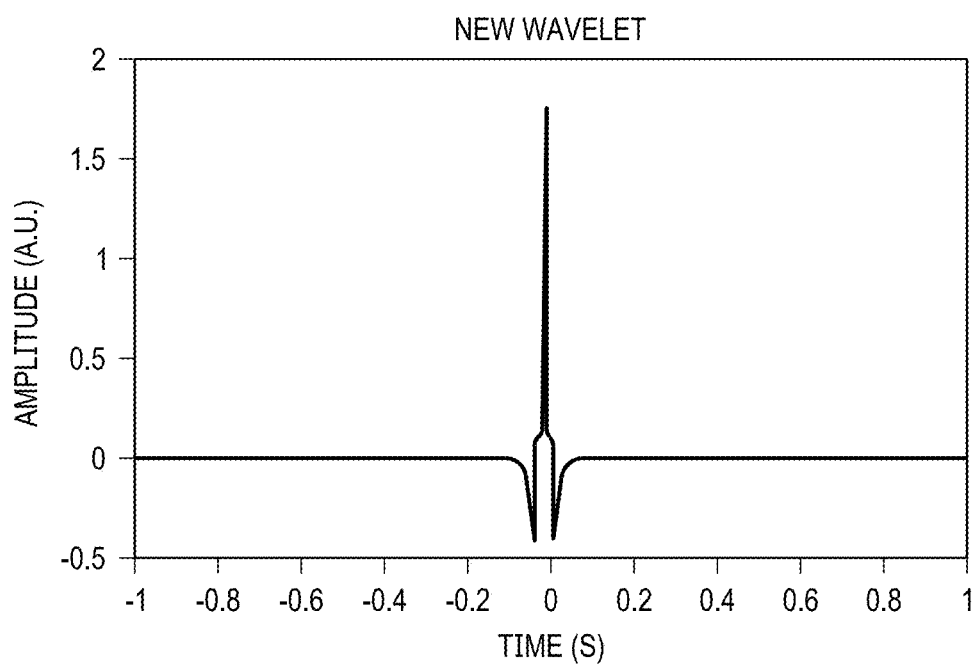
FIG. 4A illustrates an output broadband trace.
Figure 4B:
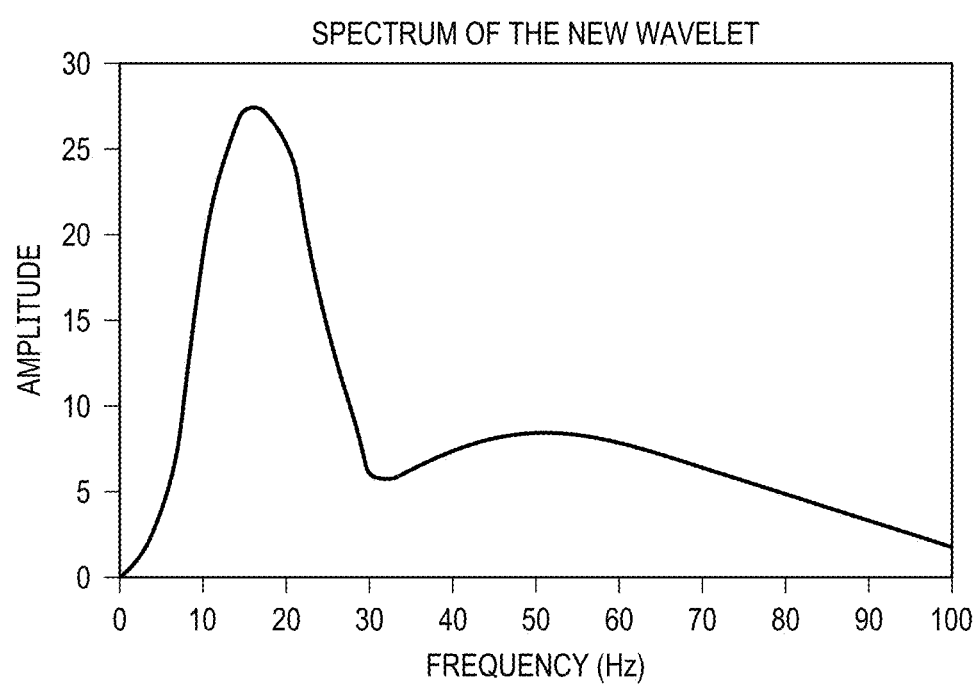
FIG. 4B illustrates a spectrum of a broadband trace.

FIG. 4A illustrates an output broadband trace. The output broadband trace from the trace of FIG. 2A is shown in FIG. 4A. The corresponding spectrum of the output broadband trace in FIG. 4A is shown in FIG. 4B. The spectrum of the output trace is broadened, up to 100 Hz, compared to the original trace in FIG. 2A.

Figure 5:
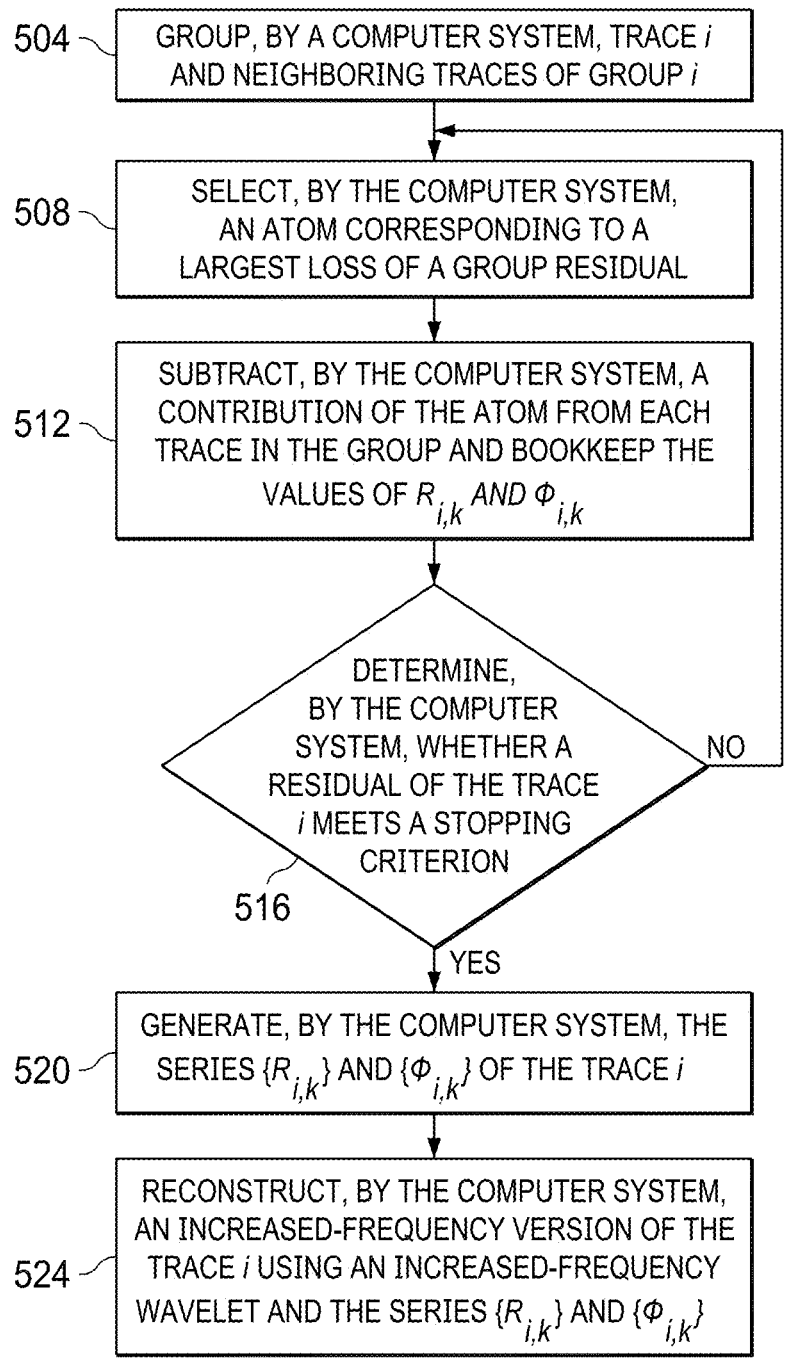
FIG. 5 illustrates a process for reconstructing an increased-frequency image.

FIG. 5 illustrates a process for reconstructing an increased-frequency image. In some implementations, the process is performed by a computer system, such as the computer system described with reference to FIG. 24. In some implementations, the reconstructing of the increased-frequency version includes performing the L0-constrained inversion using a greedy algorithm. The process shown in FIG. 5 is performed on a per trace basis. Hence, the process can readily be implemented using parallel computation.

In some implementations, the input post-stack time-domain image includes multiple traces. Reconstructing the increased-frequency version of the post-stack time-domain image includes grouping each trace i of the multiple traces with neighboring traces of the trace i into a trace group. The computer system selects an atom associated with a decrease in a residual of the group trace to provide the corresponding impulse response $R_k$ as shown in equation (1). In step 504, the computer system groups a trace i and neighboring traces of group i. Using equation (1), the trace i in the input dataset is expressed by a linear convolution model. The computer system assumes that the dictionary $\{W_k\}$ is available, and mathematically searches for a sparse series $\{R_{(i,k)}\}$ of trace i. This step is denoted as L0-constraint based inversion problem:

$$\min \Sigma_{k=1}^{n}\|R_{i,k}\|_0 \, s.t. \|S_i - \Sigma_{k=1}^{n} W_k R_{i,k}\|_2 \leq \varepsilon \cdot \|S_i\|_2 \quad (8)$$

Here, $\varepsilon$ denotes a user-defined mismatch ratio. Furthermore, in equation (8), the series $\{R_{i,k}\}$ denotes real values. Hence, the dictionary $\{W_k\}$ can be used to absorb the phase freedom $\varphi_{i,k}$ (between 0 and $\pi$) during the inversion. In step 504, the computer system groups trace i of interest with its neighboring traces. A purpose of the step 504 is to explicitly maintain coherence across neighboring traces in order to preserve substructures during the inversion process. The size of the neighborhood of trace i can be defined by a user or the computer system.

In step 508, the computer system selects an atom corresponding to a largest loss of a group residual. Once the trace group has been selected, the residual of the trace group around trace i can be determined as:

$$res_G = \Sigma_{i=1}^{m}\|S_i - \Sigma_{k=1}^{ni} W_k R_{i,k}\|_2 \quad (9)$$

Here, m denotes a trace amount in the trace group. In each iteration of the inversion, the atom selection $W_k$ is based upon a decrease in the group residual.

In step 512, the computer system subtracts a contribution of the atom from each trace in the group, that is, $W_k R_{i,k}$ in equation (9). The computer system bookkeeps (accounts for) the values of $R_{i,k}$ and $\Phi_{i,k}$. The computer system uses a dictionary including a phase rotated Ricker wavelet and Klauder wavelet. For example, the zero-phased Ricker and Klauder wavelet can be expressed as:

$$\text{Ricker wavelet: } P(t) = (1 - 2\pi^2 f^2 t^2) \exp(-\pi^2 f^2 t^2) \quad (10)$$

Klauder wavelet:

$$P(t) = \frac{\sin[B(t_{max} - t)]\cos(Ut)}{B t_{max}}, \quad (11)$$

$$\text{where } U = \pi(f_{min} + f_{max}), \; B = \frac{\pi(f_{max} - f_{min})}{t_{max}} t$$

In step 516, the computer system determines whether a residual of the trace i meets a stopping criterion. To obtain phase-rotated wavelets with a rotation phase of Y, the computer system first transforms the wavelets into the Fourier domain. The computer system multiplies a corresponding phasor $\exp(-j\omega)$ with all frequency components. The computer system transforms the Fourier frequency components back to the time domain. Examples of the phase-rotated wavelets are shown in FIGS. 6A, 6B, 6C, 6D, 7A, and 7B. For the Ricker wavelet, the dominant frequency is fixed at 15 Hz. For the Klauder wavelet, the $f_{min}$ frequency is fixed at 0.1 Hz and the $f_{max}$ frequency is fixed at 30 Hz. Both wavelets are rotated by phases of 0, $\pi/4$, $5\pi/6$ radians.

If the residual of the trace i does not meet the stopping criterion in step 516, the computer system next performs step 508. If the residual of the trace i meets the stopping criterion in step 516, the computer system next performs step 520. In step 520, the computer system generates the series $\{R_{i,k}\}$ and $\{\Phi_{i,k}\}$ of the trace i.

In step 524, the computer system reconstructs an increased-frequency version of the trace i using an increased-frequency wavelet and the series $\{R_{i,k}\}$ and $\{\Phi_{i,k}\}$.

While performing an atom selection step in the inversion procedure, that is, step 508, the computer system sets $f_{min}$ to 0.1 Hz. Thus, four free parameters are searched: for a Ricker wavelet, the dominant frequency f and the rotation phase $\varphi$ are determined; for a Klauder wavelet, the $f_{max}$ frequency and the rotation phase $\varphi$ are determined. As the unknown space for these free parameters can be large, the computer system uses a three-level matching pursuit algorithm to solve the atom selection problem. The algorithm is summarized as follows.

The computer system can set the parameters: L0_init_f_r, L0_step_f_r, L0_init_phi_r, L0_step_phi_r, L0_N_f_r, L0_N_phi_r, L1_step_phi_r, L1_step_f_r, L2_step_phi_r, L2_step_f_r, L0_init_f_k, L0_step_f_k, L0_init_phi_k, L0_step_phi_k, L0_N_f_k, L0_N_phi_k, L1_step_phi_k, L1_step_f_k, L2_step_phi_k, L2_step_f_k, and $\varepsilon$. The conditions to be met are: L0_step_f_r≥L1_step_f_r≥L2_step_f_r, L0_step_phi_r≥L1_step_phi_r≥L2_step_phi_r, L0_step_f_k≥L1_step_f_k≥L2_step_f_k, and L0_step_phi_k≥L1_step_phi_k≥L2_step_phi_k.

Step 1: Group trace i and its neighboring traces, $S_j$=1, 2, . . . , m, with $S_1$ denoting trace i. The bookkeep mismatch threshold is: $\vartheta = \varepsilon \cdot \|S_1\|_2$.

Step 2: Set u=0, v=0, k=0, $res_{G,ricker} = res_{G,klauder} = \Sigma_{j=1}^{m}\|S_j\|_2$.

Step 3: Generate a Ricker wavelet with a dominant frequency of L0_init_f_r+u*L0_step_f_r and a phase of L0_init_phi_r+v*L0_step_phi_r.

Step 4: Use the wavelet to build the corresponding convolution matrix W, and for each trace $S_j$ in the group, solve the sub-problem: $\min\|S_j - WR_j\|_2$ s.t. $\|R_j\|_0 = 1$.

Step 5: If $res_{G,ricker} < \Sigma_{j=1}^{m}\|S_j - WR_j\|_2$, then set $res_{G,ricker} = \Sigma_{j=1}^{m}\|S_j - WR_j\|_2$, bookkeep f_$r_{i,k}$=L0_init_f_r+u*L0_step_f_r and phi_$r_{i,k}$=L0_init_phi_r+v*L0_step_phi_r, and go to step 6; otherwise, go to step 6.

Step 6: Set v=v+1. If v>L0_N_phi_r, set v=0 and go to step 7; otherwise, and go to step 3.

Step 7: Set u=u+1. If u>L0_N_f_r, go to step 8; otherwise, go to step 3.

Step 8: Set u=0, v=0, L1_init_f_r=f_$r_{i,k}$-L0_step_f_r, L1_init_phi_r=phi_$r_{i,k}$-L0_step_phi_r, L1_N_phi_r=round(2×L0_step_phi_r=L1_step_phi_r), L1_N_f_r=round(2×L0_step_f_r=L1_step_f_r).

Step 9: Generate a Ricker wavelet with a dominant frequency of L1_init_f_r+u×L1_step_f_r and a phase of L1_init_phi_r+v*L1_step_phi_r.

Step 10: Use the wavelet to build the corresponding convolution matrix W, and for each trace $S_j$ in the group, solve the sub-problem: $\min\|S_j - WR_j\|_2$ s.t. $\|R_j\|_0 = 1$.

Step 11. If $res_{G,ricker} = \Sigma_{j=1}^{m}\|S_j - WR_j\|_2$, then set $res_{G,ricker} = \Sigma_{j=1}^{m}\|S_j - WR_j\|_2$, bookkeep f_$r_{i,k}$=L1_init_f_r+u×L1_step_f_r and phi_$r_{i,k}$=L1_init_phi_r+v×L1_step_phi_r, and go to step 12; otherwise, go to step 12.

Step 12: Set v=v+1. If v>L1_N_phi_r, set v=0 and go to step 13; otherwise, and go to step 9.

Step 13. Set u=u+1. If u>L1_N_f_r, go to step 14; otherwise, go to step 9.

Step 14: Set u=0, v=0, L2_init_f_r f_$r_{i,k}$-L1_step_f_r, L2_init_phi_r=phi_$r_{i,k}$-L1_step_phi_r, L2_N_phi_r=round(2*L1_step_phi_r/L2_step_phi_r), L2_N_f_r=round(2×L1_step_f_r/L2_step_f_r).

Step 15: Generate a Ricker wavelet with a dominant frequency of L2_init_f_r+u×L2_step_f_r and a phase of L2_init_phi_r+v×L2_step_phi_r.

Step 16: Use this wavelet to build the corresponding convolution matrix W, and for each trace $S_j$ in the group, solve this sub-problem: $\min|S_j - WR_j|_2$ s.t. $|R_j|_0 = 1$.

Step 17: If $res_{G,ricker} < \Sigma_{j=1}^{m}\|S_j - WR_j\|_2$, then set $res_{G,ricker} = \Sigma_{j=1}^{m}\|S_j - WR_j\|_2$, bookkeep f_$r_{i,k}$=L2_init_f_r+u×

L2_step_f_r and phi_r$_{i,k}$=L2_init_phi_r+v×L2_step_phi_r, and go to step 18; otherwise, go to step 18.

Step 18: Set v=v+1. If v>L2_N_phi_r, set v=0 and go to step 19; otherwise, go to step 15.

Step 19: Set u=u+1. If u>L2_N_f_r, go to step 20; otherwise, go to step 15.

Step 20: Set u=0, v=0.

Step 21: Generate a Klauder wavelet with an $f_{max}$ frequency of L0_init_f_k+u×L0_step_f_k and a phase of L0_init_phi_k+v×L0_step_phi_k.

Step 22: Use this wavelet to build the corresponding convolution matrix W, and for each trace $S_j$ in the group, solve the sub-problem: $\min\|S_j-WR_j\|_2$ s.t. $\|R_j\|_0=1$.

Step 23: If $res_{G,klauder} < \sum_{j=1}^{m}\|S_j-WR_j\|_2$, then set $res_{G,klauder} = \sum_{j=1}^{m}\|S_j-WR_j\|_2$, bookkeep f_k$_{i,k}$=L0_init_f_k+u×L0_step_f_k and phi_k$_{i,k}$=L0_init_phi_k+v×L0_step_phi_k, and go to step 24; otherwise, go to step 24.

Step 24: Set v=v+1. If v>L0_N_phi_k, set v=0 and go to step 25; otherwise, go to step 21.

Step 25: Set u=u+1. If u>L0_N_f_k, go to step 26; otherwise, go to step 21.

Step 26: Set u=0, v=0, L1_init_f_k=f_k$_{i,k}$−L0_step_f_k, L1_init_phi_k=phi_k$_{i,k}$−L0_step_phi_k, L1_N_phi_k round (2×L0_step_phi_k/L1_step_phi_k), L1_N_f_k=round (2×L0_step_f_k/L1_step_f_k).

Step 27: Generate a Klauder wavelet with an $f_{max}$ frequency of L1_init_f_k+u*L1_step_f_k and a phase of L1_init_phi_k+v×L1_step_phi_k.

Step 28: Use this wavelet to build the corresponding convolution matrix W, and for each trace S; in the group, solve this sub-problem: $\min\|S_j-WR_j\|_2$ s.t. $\|R_j\|_0=1$.

Step 29: If $res_{G,klauder} = \sum_{j=1}^{m}\|S_j-WR_j\|_2$, then set $res_{G,klauder} = \sum_{j=1}^{m}\|S_j-WR_j\|_2$, bookkeep f_k$_{i,k}$=L1_init_f_k+u×L1_step_f_k and phi_k$_{i,k}$=L1_init_phi_k+v×L1_step_phi_k, and go to step 30; otherwise, go to step 30.

Step 30: Set v=v+1. If v>L1_N_phi_k, set v=0 and go to step 31; otherwise, and go to step 27.

Step 31: Set u=u+1. If u>L1_N_f_k, go to step 32; otherwise, go to step 27.

Step 32: Set u=0, v=0, L2_init_f_k=f_k$_{i,k}$−L1_step_f_k, L2_init_phi_k=phi_k$_{i,k}$−L1_step_phi_k, L2_N_phi_k round (2*L1_step_phi_k/L2_step_phi_k), L2_N_f_k=round (2×L1_step_f_k/L2_step_f_k).

Step 33: Generate a Klauder wavelet with an $f_{max}$ frequency of L2_init_f_k+u×L2_step_f_k and a phase of L2_init_phi_k+v*L2_step_phi_k.

Step 34: Use this wavelet to build the corresponding convolution matrix W, and for each trace S; in the group, solve this sub-problem: $\min\|S_j-WR_j\|_2$ s.t. $\|R_j\|_0=1$.

Step 35: If $res_{G,klauder} < \sum_{j=1}^{m}\|S_j-WR_j\|_2$, then set $res_{G,klauder} = \sum_{j=1}^{m}\|S_j-WR_j\|_2$, bookkeep f_k$_{i,k}$=L2_init_f_k+u×L2_step_f_k and phi_k$_{i,k}$=L2_init_phi_k+v×L2_step_phi_k, and go to step 36; otherwise, go to step 36.

Step 36: Set v=v+1. If v>L2_N_phi_k, set v=0 and go to step 37; otherwise, go to step 33.

Step 37: Set u=u+1. If u>L2_N_f_k, go to step 38; otherwise, go to step 33.

Step 38: If $res_{G,klauder} < res_{G,ricker}$, set atom_type$_{i,k}$=Ricker, f$_{i,k}$=f_r$_{i,k}$, and phi$_{i,k}$=phi_r$_{i,k}$; otherwise, set atom_type$_{i,k}$=Klauder, f$_{i,k}$=f_k$_{i,k}$, phi$_{i,k}$=phi_k$_{i,k}$.

Step 39: Subtract the contribution of this atom from all traces in this group. In other words, use selected atom_type$_{i,k}$, f$_{i,k}$ and phi$_{i,k}$ to generate a wavelet, build the corresponding convolution matrix W, solve this sub-problem, $\min\|S_j-WR_j\|_2$ s.t. $\|R_j\|_0=1$, for each trace $S_j$ in the group, and then set $S_j=S_j-WR_j$. Bookkeep R$_{i,k}$=R$_1$.

Step 40: If $\|S_1\|_2<\vartheta$, output series {atom_type$_{i,k}$, f$_{i,k}$, phi$_{i,k}$, R$_{i,k}$}, and go to Step 241; otherwise, set k=k+1, and go to Step 3.

Step 41: Use a Ricker wavelet with user-defined dominant frequency $f_0$ along with series {phi$_{i,k}$, R$_{i,k}$} to reconstruct the increased-frequency trace corresponding to trace i.

Step 41 uses estimated phase information and reflection responses of the trace i, i.e. {phi$_{i,k}$, R$_{i,k}$}, to reconstruct the increased-frequency trace using a new wavelet. The algorithmic steps are disclosed below. The Ricker wavelet is used as the replacement wavelet type.

A process for reconstructing an increased-frequency trace with the user-defined dominant frequency $f_0$ for the Ricker wavelet and estimated series {phi$_{i,k}$, R$_{i,k}$} is disclosed here:

Step 1: Set k=0, and create an empty increased-frequency trace H$_i$.

Step 2: Generate a Ricker wavelet with a dominant frequency of $f_0$ and a phase of phi$_{i,k}$.

Step 3: Use this wavelet to build the corresponding convolution matrix W. Add a contribution of this atom and R$_{i,k}$ to H$_i$, such as H$_i$=H$_i$+WR$_{i,k}$.

Step 4: Set k=k+1. If series {phi$_{i,k}$, R$_{i,k}$} are depleted, then go to step 5; otherwise, go to step 2.

Step 5: Output the increased-frequency trace H$_i$.

The implementations disclosed are thus able to broaden the bandwidth of post-stack images without physically acquiring expensive high-frequency field data. The implementations are thus valuable for seismic interpretation and seismic exploration projects.

Figure 6A:
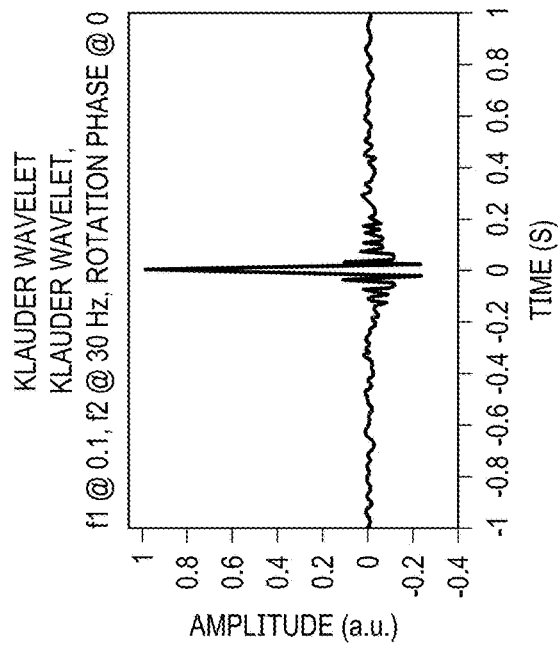
FIG. 6A illustrates a Klauder wavelet having a zero radian rotation phase.
Figure 6B:
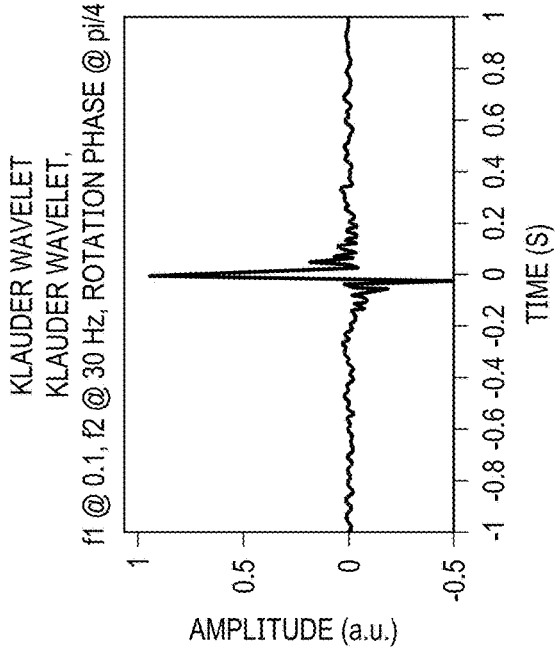
FIG. 6B illustrates a Klauder wavelet having a rotation phase of $\pi/4$ radians.
Figure 6C:
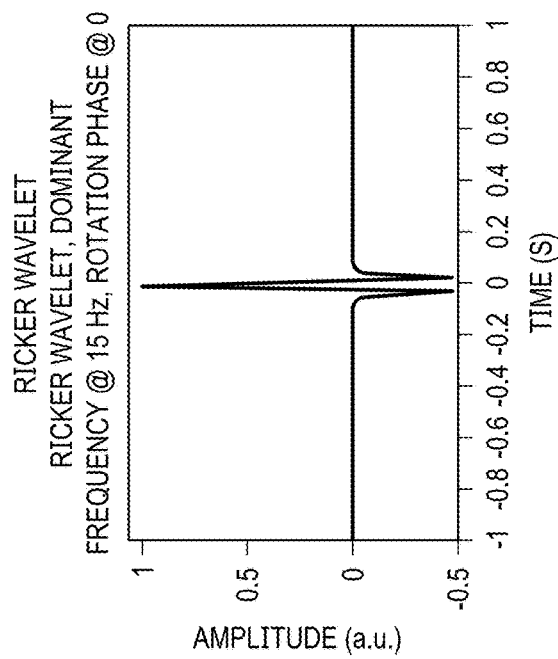
FIG. 6C illustrates a Ricker wavelet having a 15 Hz dominant frequency and a zero radian rotation phase.
Figure 6D:
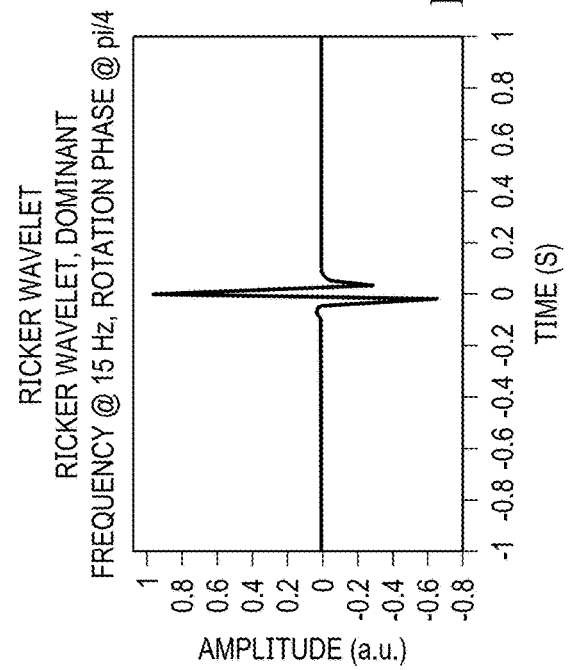
FIG. 6D illustrates a Ricker wavelet having a rotation phase of $\pi/4$ radians.

FIG. 6A illustrates a Klauder wavelet having a zero radian rotation phase. The $f_{min}$ frequency is 0.1 Hz and $f_{max}$ frequency is 30 Hz. FIG. 6B illustrates a Klauder wavelet having a rotation phase of π/4 radians. The $f_{min}$ frequency is 0.1 Hz and $f_{max}$ frequency is 30 Hz. FIG. 6C illustrates a Ricker wavelet having a 15 Hz dominant frequency and a zero radian rotation phase. FIG. 6D illustrates a Ricker wavelet having a rotation phase of π/4 radians. The dominant frequency shown in FIG. 6D is 15 Hz.

Figure 7A:
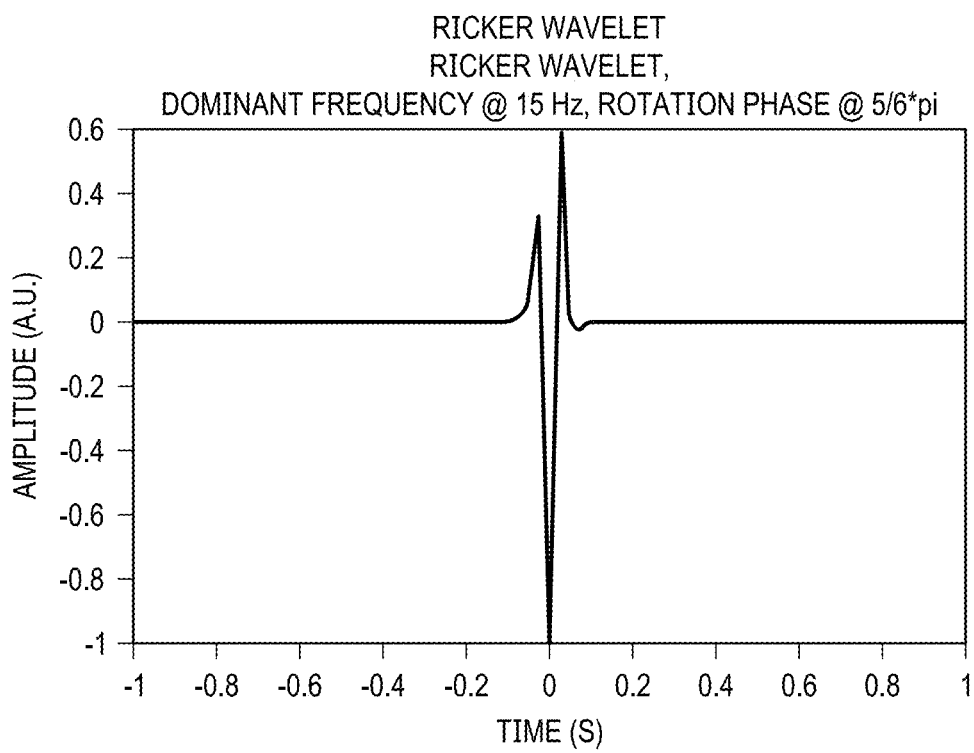
FIG. 7A illustrates a Ricker wavelet having a rotation phase of $5\pi/6$ radians.
Figure 7B:
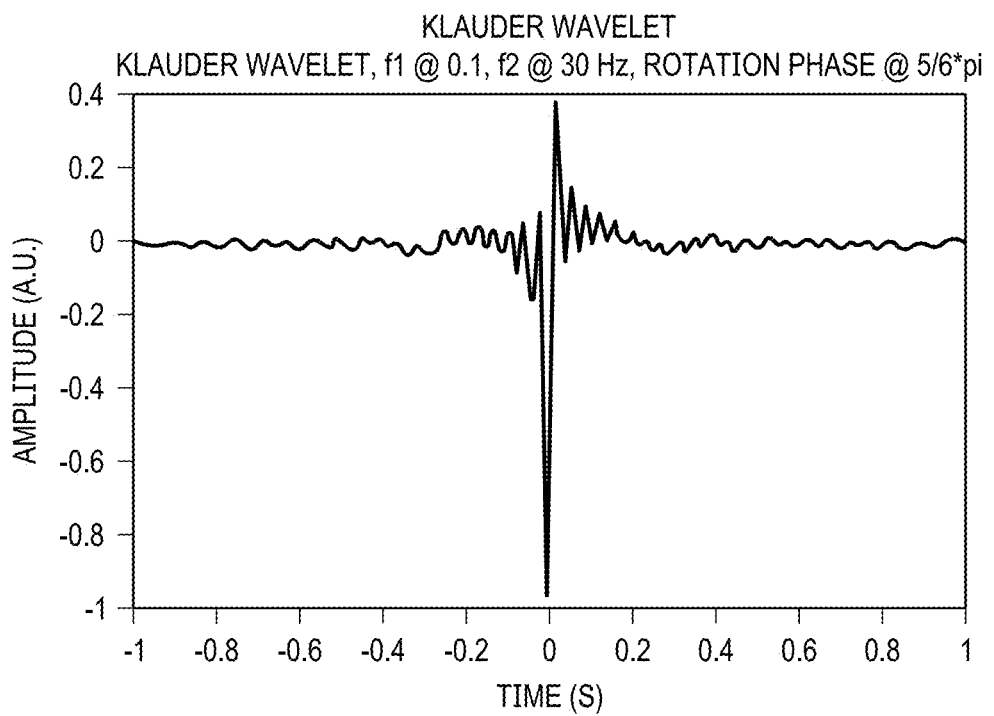
FIG. 7B illustrates a Klauder wavelet having a rotation phase of $5\pi/6$ radians.

FIG. 7A illustrates a Ricker wavelet having a rotation phase of 5π/6 radians. The dominant frequency shown in FIG. 7A is 15 Hz. FIG. 7B illustrates a Klauder wavelet having a rotation phase of 5π/6 radians. The $f_{min}$ frequency is 0.1 Hz and $f_{max}$ frequency is 30 Hz. In some implementations, the computer system assumes that the post-stack images are in accordance with a linear convolution model. Using a dictionary containing wavelet atoms, the computer system solves an L0-constrained inversion problem to estimate reflection responses and phase information of the source wavelet for each event in the input image. Using the estimated phase information and reflection responses, an increased-frequency image can be reconstructed via a Ricker wavelet with a user-defined dominant frequency being used as the mother wavelet. The reconstructed increased-frequency image is combined with the original image through a weighted summation step in the frequency domain in order to achieve a bandwidth-broadened image.

Figure 8A:
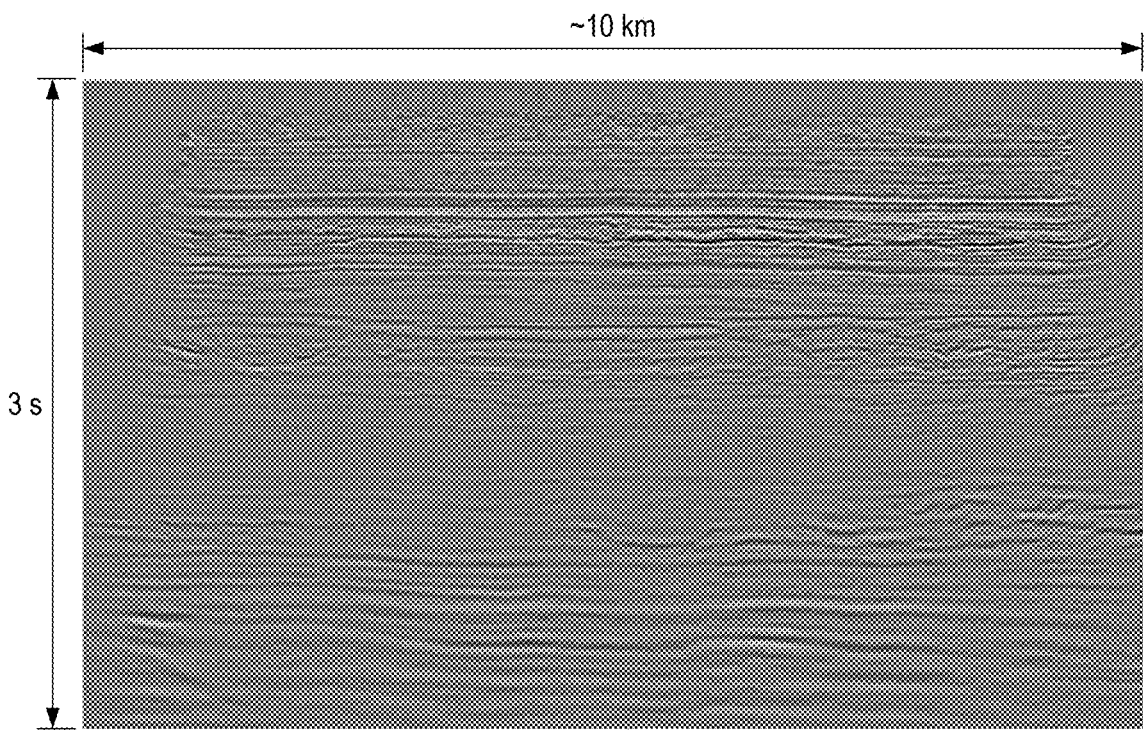
FIG. 8A illustrates an input image of a first inline.

FIG. 8A illustrates an input image of a first inline. The term "inline" refers to a direction in which the signal receiver cables are deployed. The term "crossline" refers to the direction that is perpendicular to the inline direction. In some experiments performed using the disclosed implementations, a 3D open source dataset (the Volve dataset-https://data.equinor.com/authenticate) was used as a test bed. The Volve dataset is a 3D Ocean Bottom Cable dataset and it contains both pre-stack and post-stack data. The concrete post-stack image used was ST0202R08_PS_PSDM_RAW_PP_TIME.MIG_RAW.

POST_STACK.3D.JS-017534.segy. This image can be described as follows. In total, there are 58479 traces in this image, including 193 inlines by 303 crosslines. Both the inline interval and crossline interval are 25 meters (m). The time sampling rate is 2 milliseconds (ms). The record length is 3 seconds (s). Thus, in total, there are 1500 time samples per trace. More comprehensive results of two inlines of this 3D dataset are shown in FIGS. 8B-23.

Figure 8B:
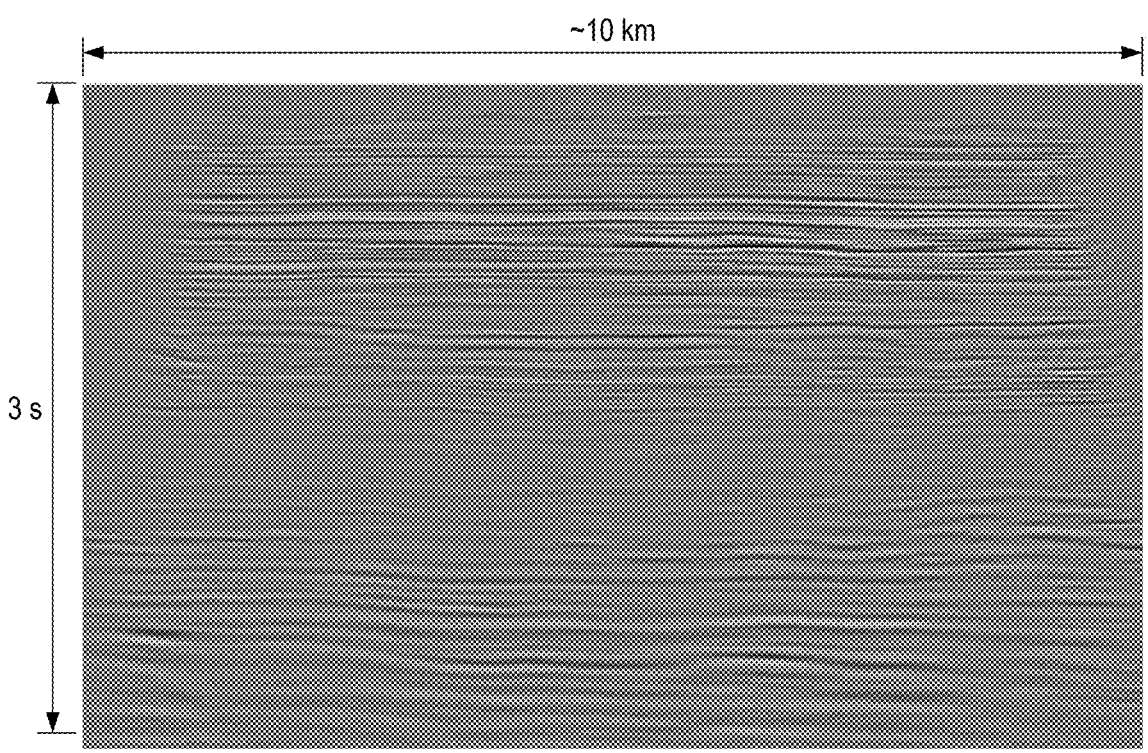
FIG. 8B illustrates an image of a first inline with jitters removed.
Figure 9A:
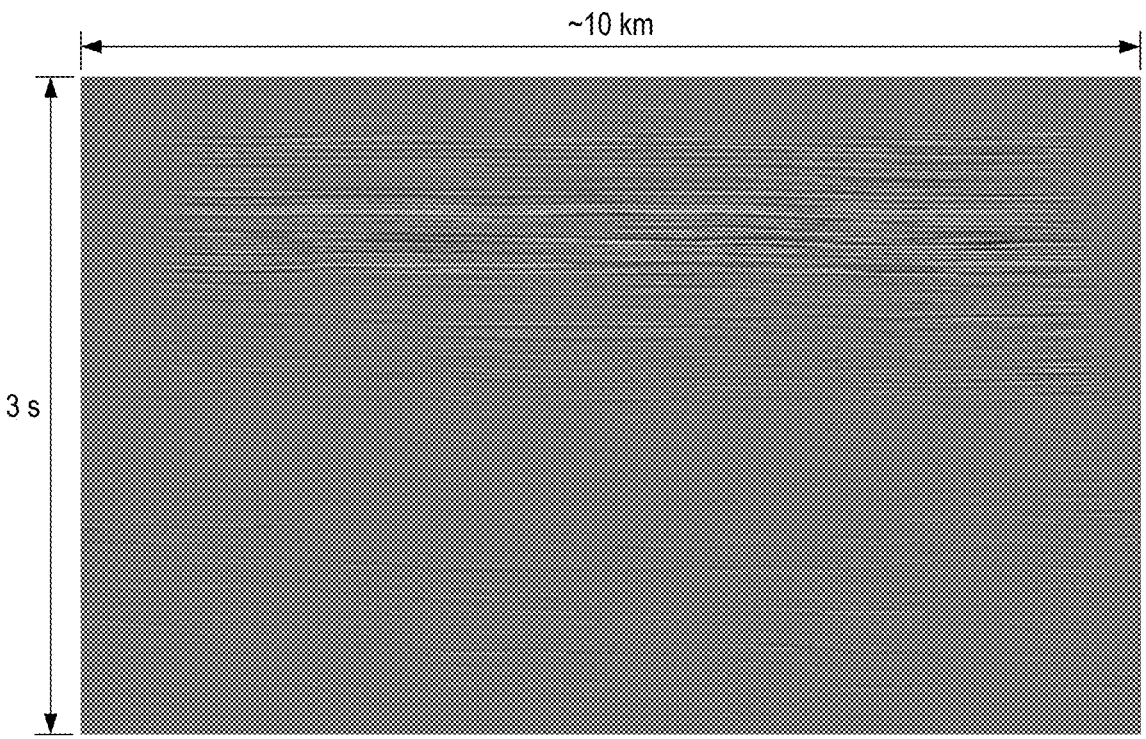
FIG. 9A illustrates a reconstructed increased-frequency image.
Figure 9B:
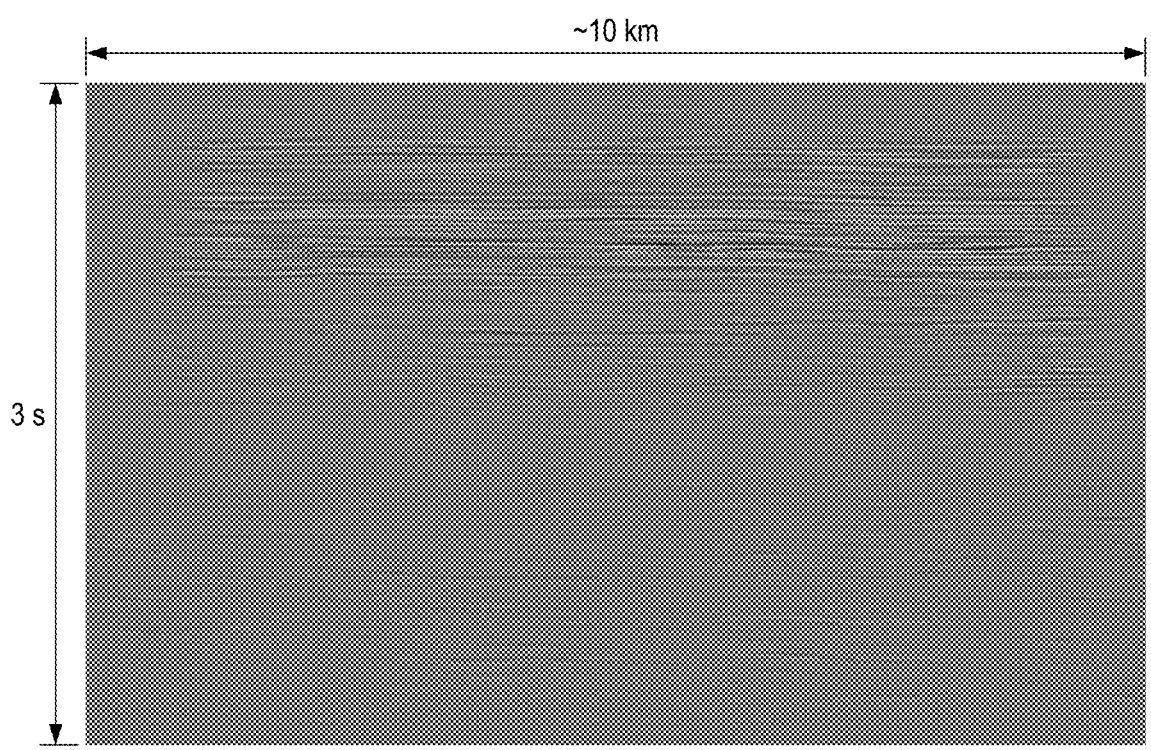
FIG. 9B illustrates an image with structural artifacts removed.
Figure 10:
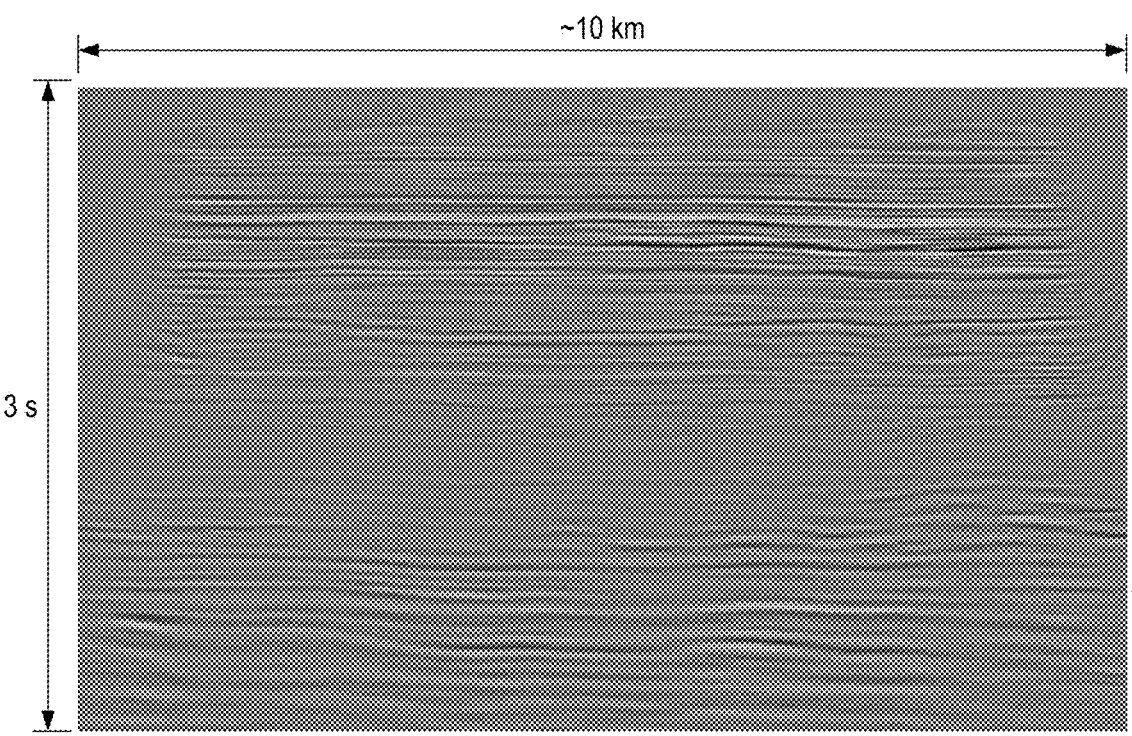
FIG. 10 illustrates a bandwidth-broadened image of the first inline.

FIG. 8B illustrates an image of a first inline with jitters removed. The jitters visible in FIG. 8A are removed using SVD. FIG. 9A illustrates a reconstructed increased-frequency image. The reconstructed image in FIG. 9A corresponds to the input post-stack time-domain image of FIG. 8A. FIG. 9B illustrates an image with structural artifacts removed. The structural artifacts present in FIG. 9A are removed using SVD. FIG. 10 illustrates a bandwidth-broadened image of a first inline. The images of FIGS. 8B and 9B are summed together via a weighting function in the frequency domain.

Figure 11:
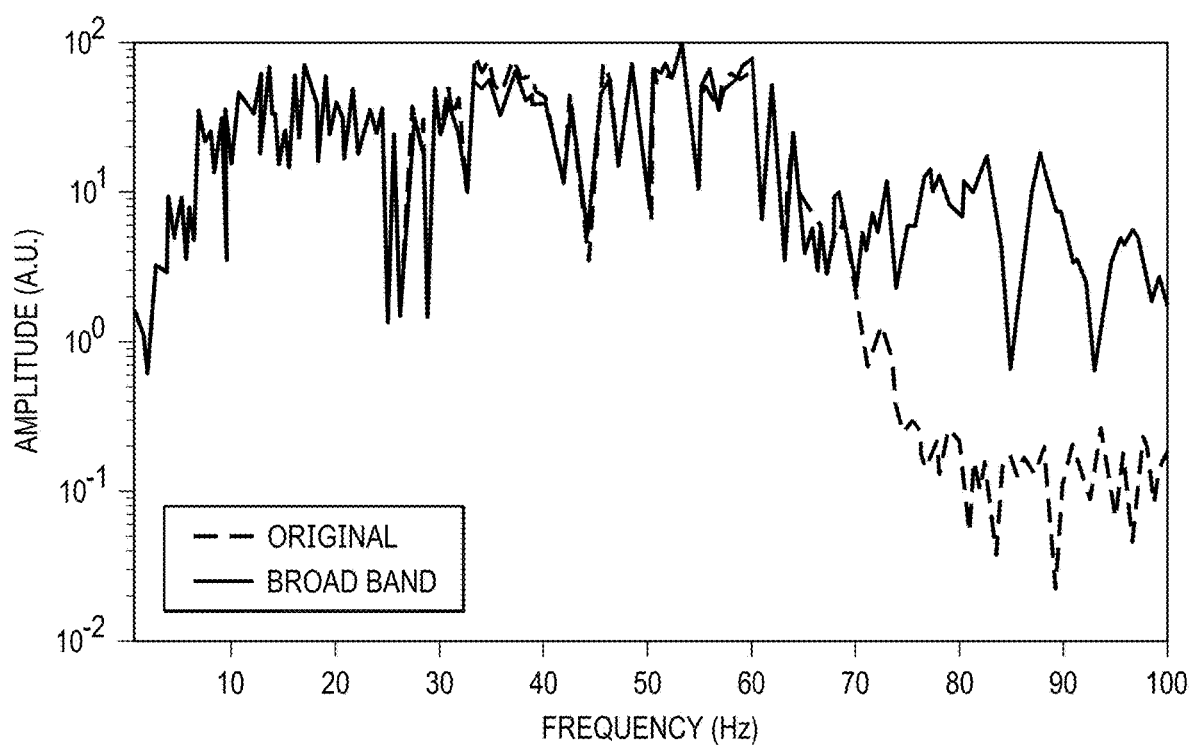
FIG. 11 illustrates spectra of an image before and after bandwidth enhancement.
Figure 12A:
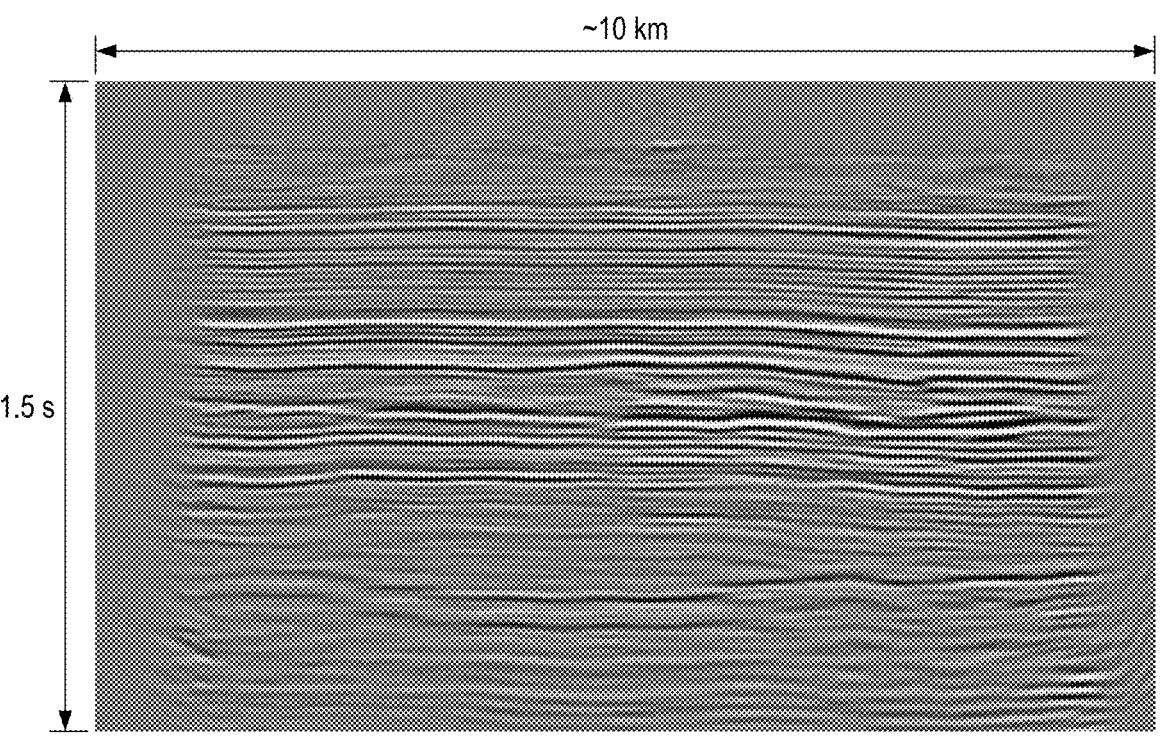
FIG. 12A illustrates an effect of bandwidth broadening.
Figure 12B:
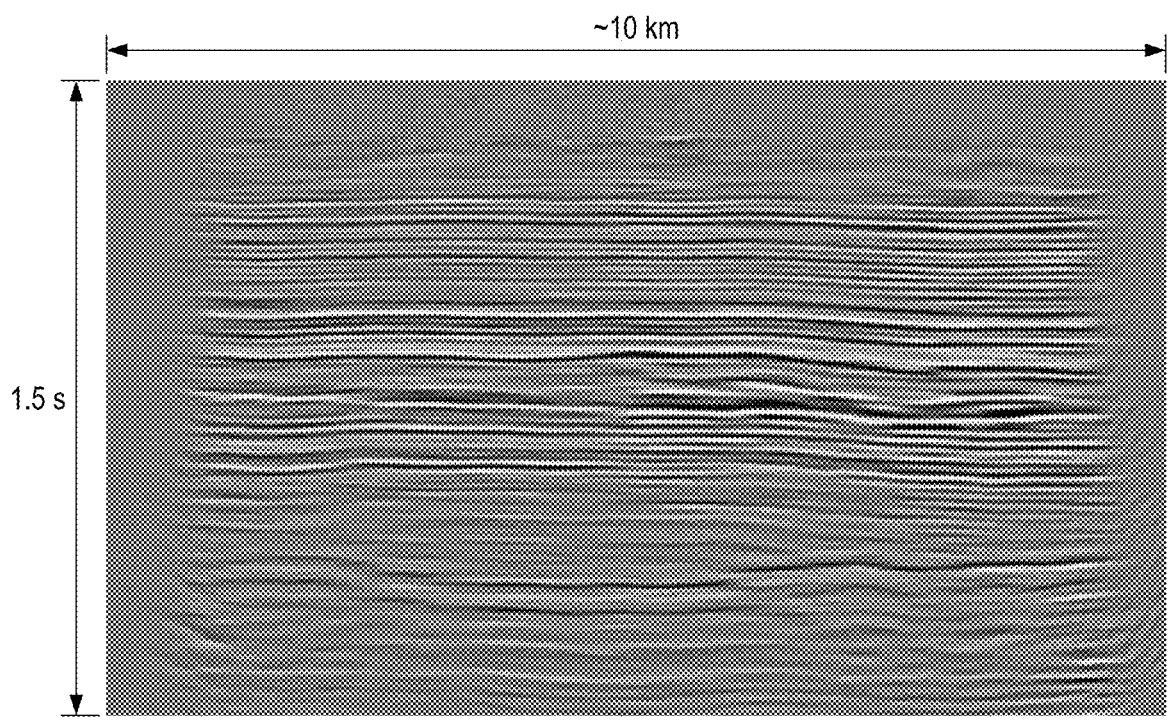
FIG. 12B illustrates an effect of bandwidth broadening.
Figure 13:
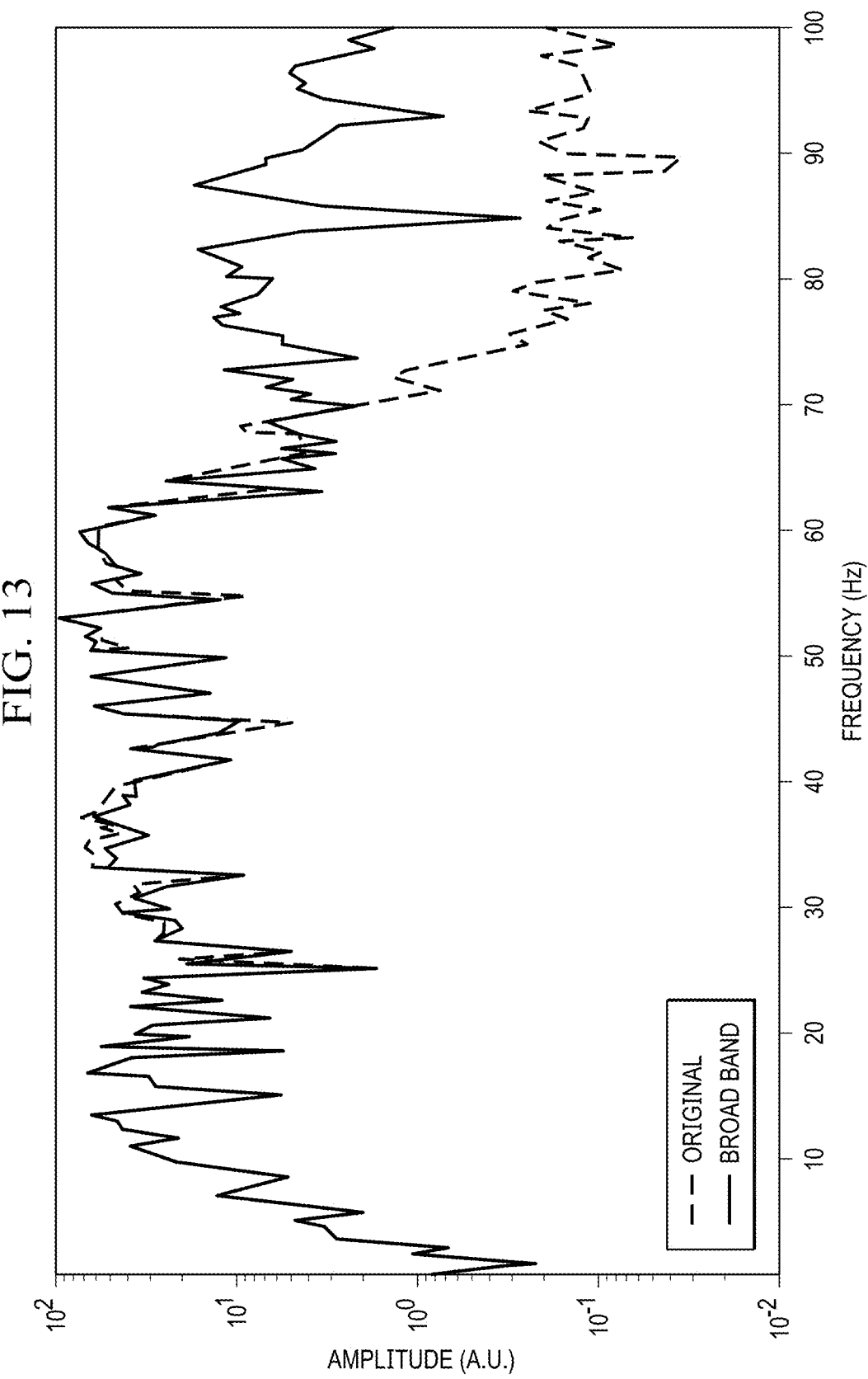
FIG. 13 illustrates spectra of multiple images.
Figure 14A:
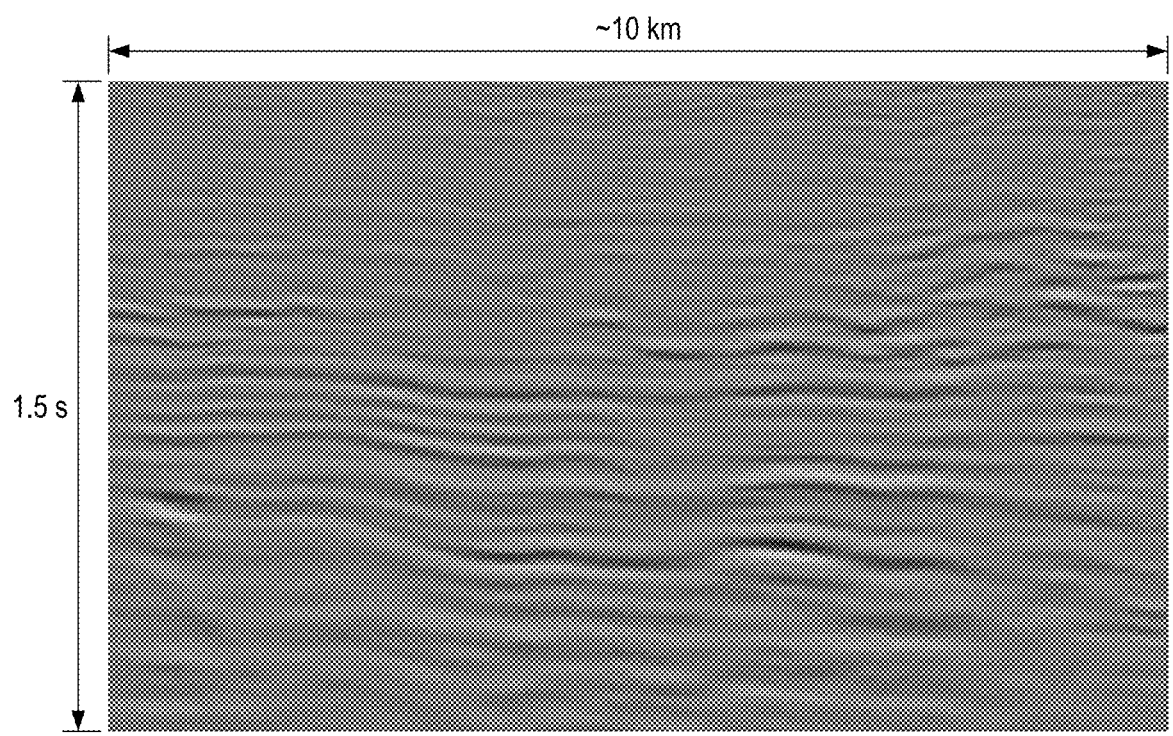
FIG. 14A illustrates a portion of the first inline with jitters removed.
Figure 14B:
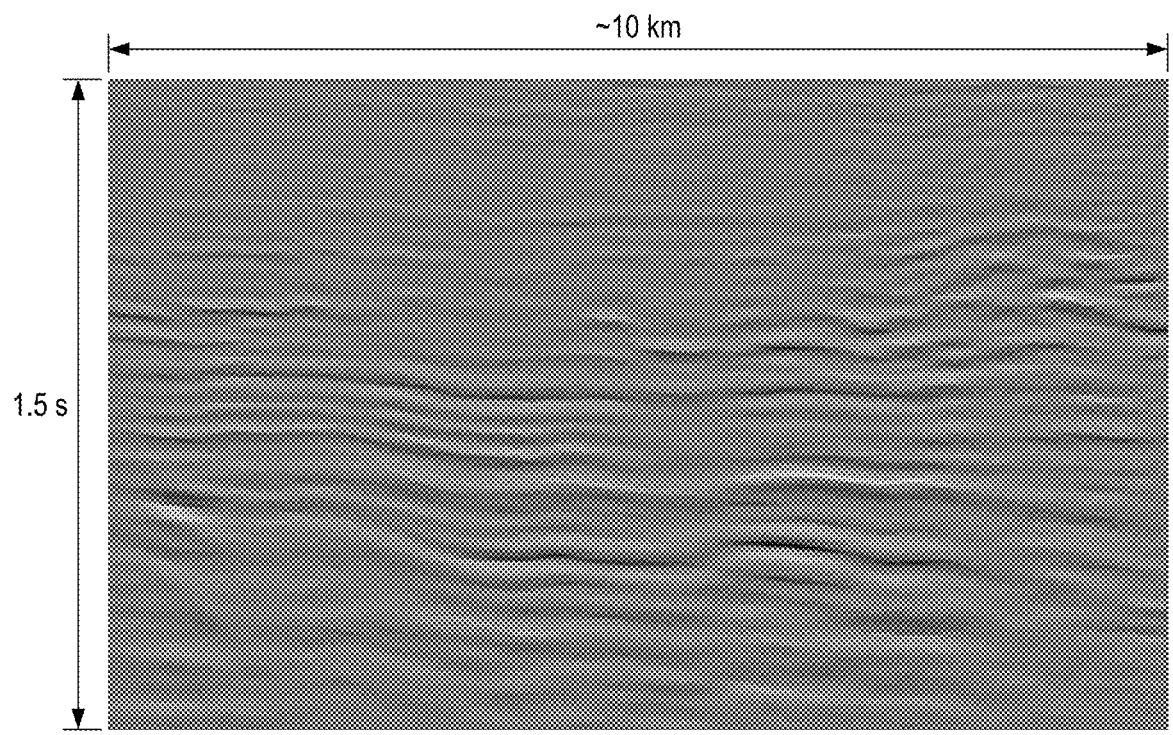
FIG. 14B illustrates a portion of a bandwidth-broadened image of the first inline.
Figure 15:
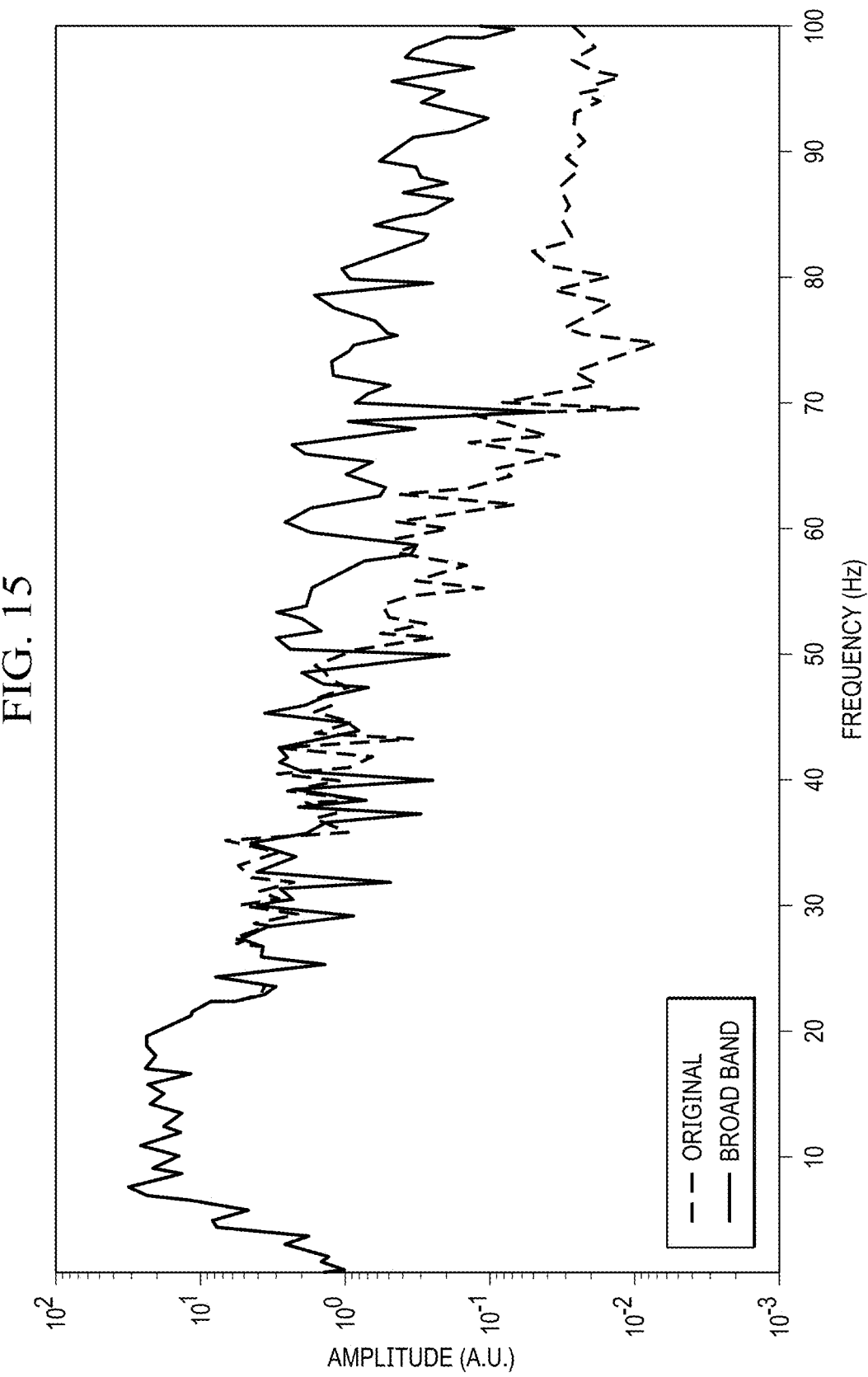
FIG. 15 illustrates spectra of multiple images.

FIG. 11 illustrates spectra of an image before and after bandwidth enhancement. FIG. 12A illustrates an effect of bandwidth broadening. The first half portion (the first 1.5 s) of FIG. 8B is shown in FIG. 12A. This is sometimes referred to as a "shallow part." FIG. 12B illustrates an effect of bandwidth broadening. FIG. 12B shows the first half portion of FIG. 10. FIG. 13 illustrates spectra of multiple images. FIG. 13 shows the spectra of the images of FIGS. 12A and 12B, illustrating the effect of bandwidth broadening. FIG. 14A illustrates a portion of a first inline with jitters removed. FIG. 14A shows the last half portion (the last 1.5 s) of FIG. 8B. This is sometimes referred to as a "bottom part." FIG. 14B illustrates a portion of a bandwidth-broadened image of a first inline. FIG. 14B shows the last half portion (the last 1.5 s) of FIG. 10. FIG. 15 illustrates spectra of multiple images. FIG. 15 shows the spectra of the images in FIGS. 14A and 14B, illustrating the effect of bandwidth broadening.

Figure 16A:
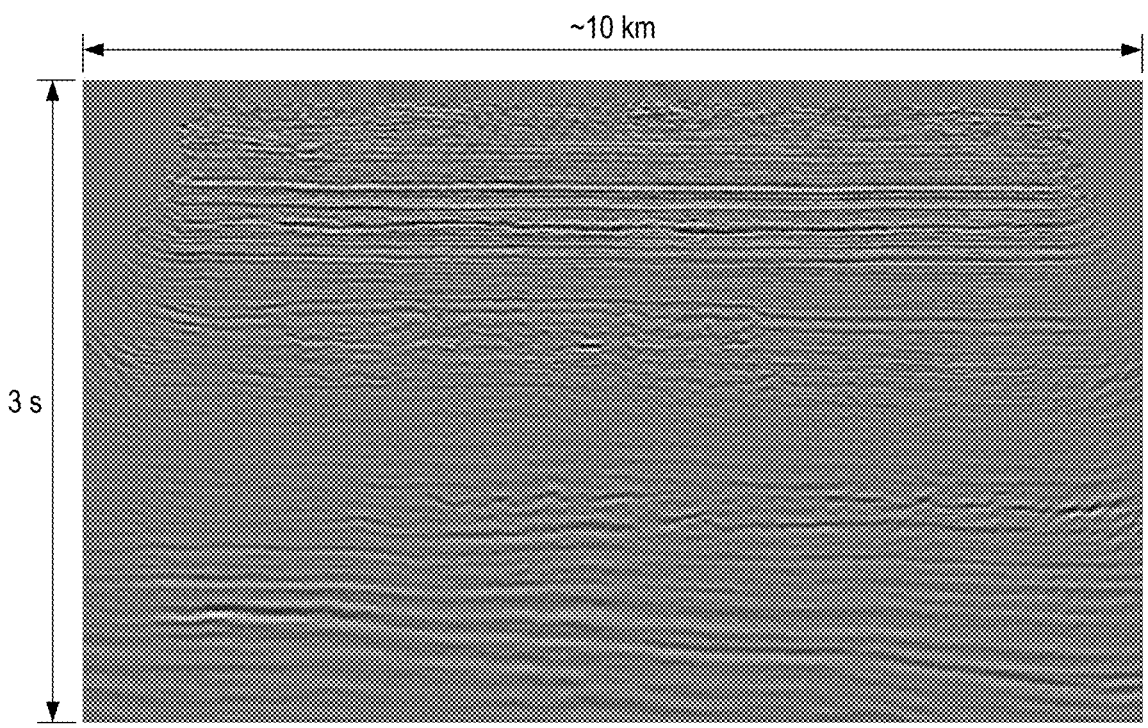
FIG. 16A illustrates an input image of a second inline.
Figure 16B:
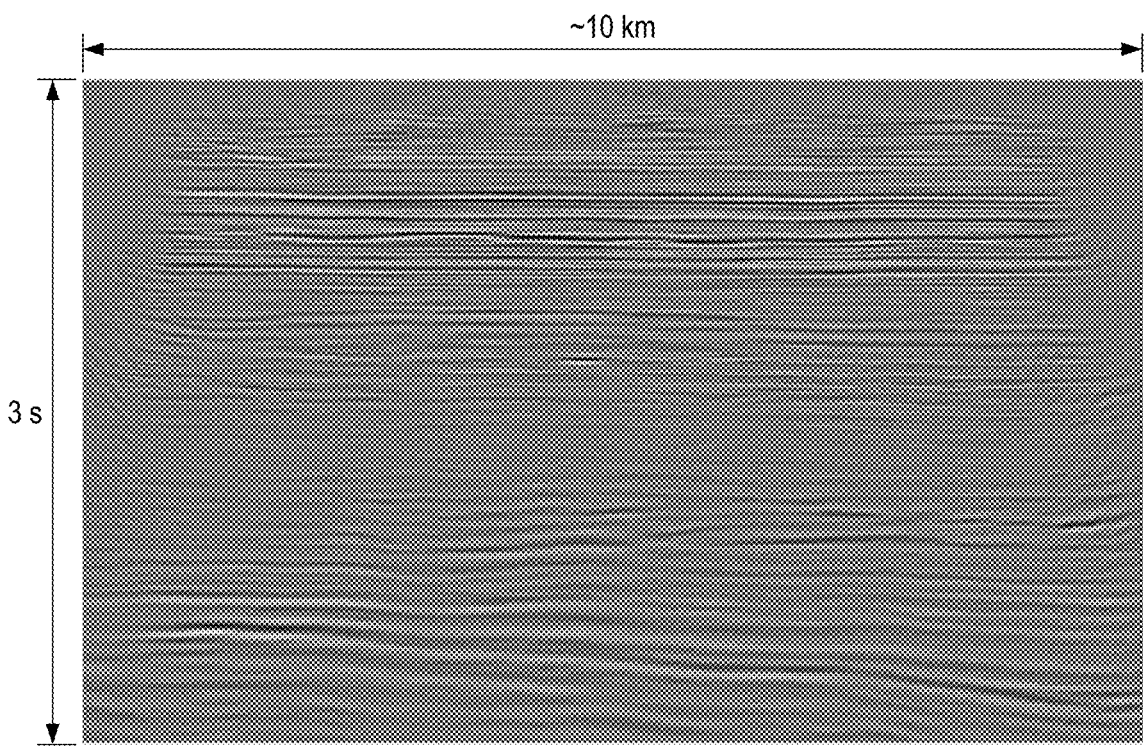
FIG. 16B illustrates an image of the second inline with jitters removed.
Figure 17A:
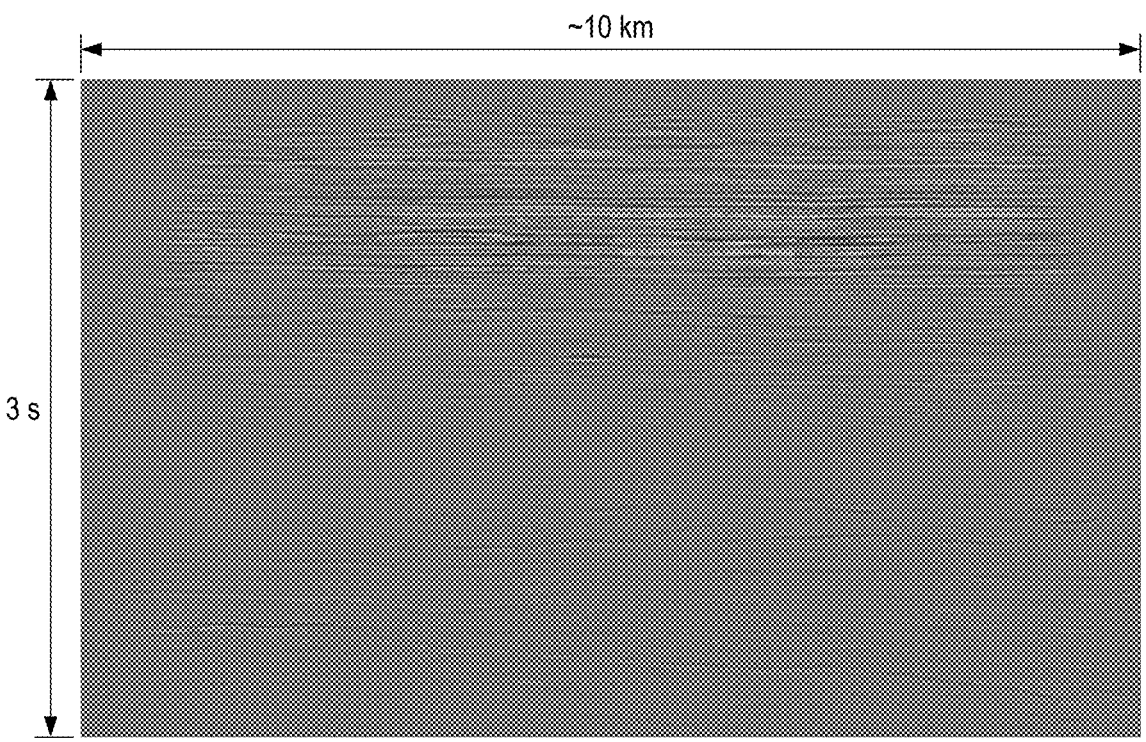
FIG. 17A illustrates a reconstructed increased-frequency image.
Figure 17B:
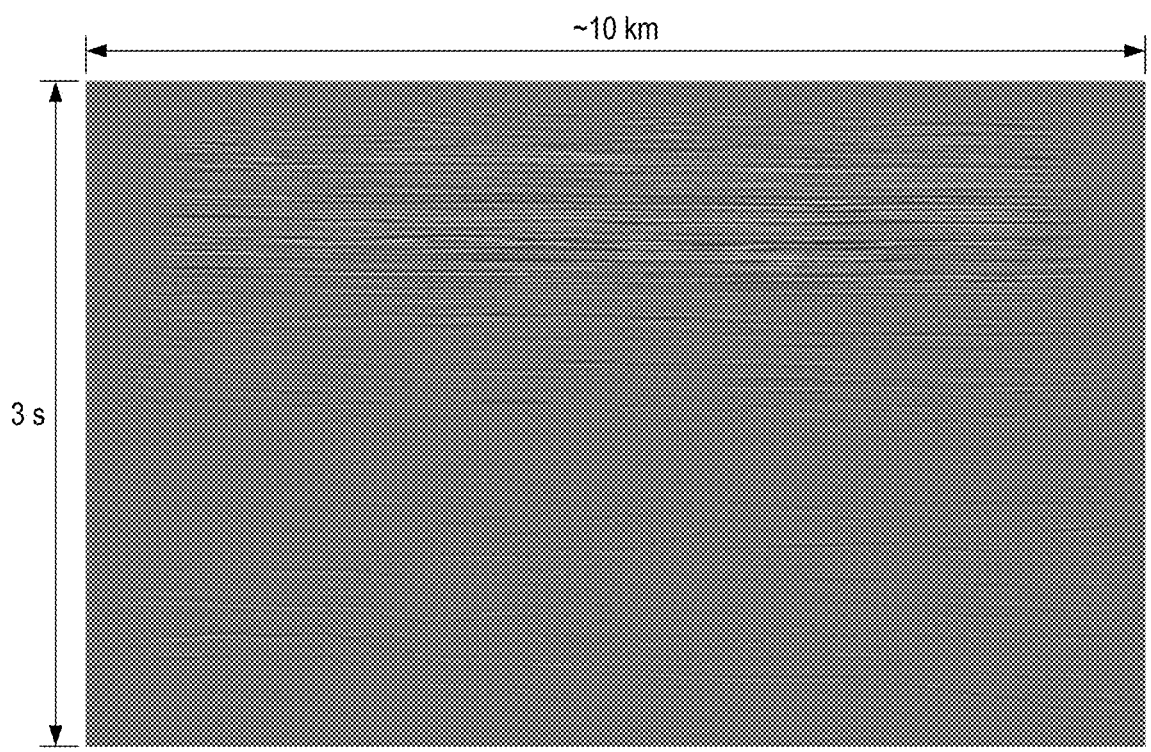
FIG. 17B illustrates an image with structural artifacts removed.
Figure 18:
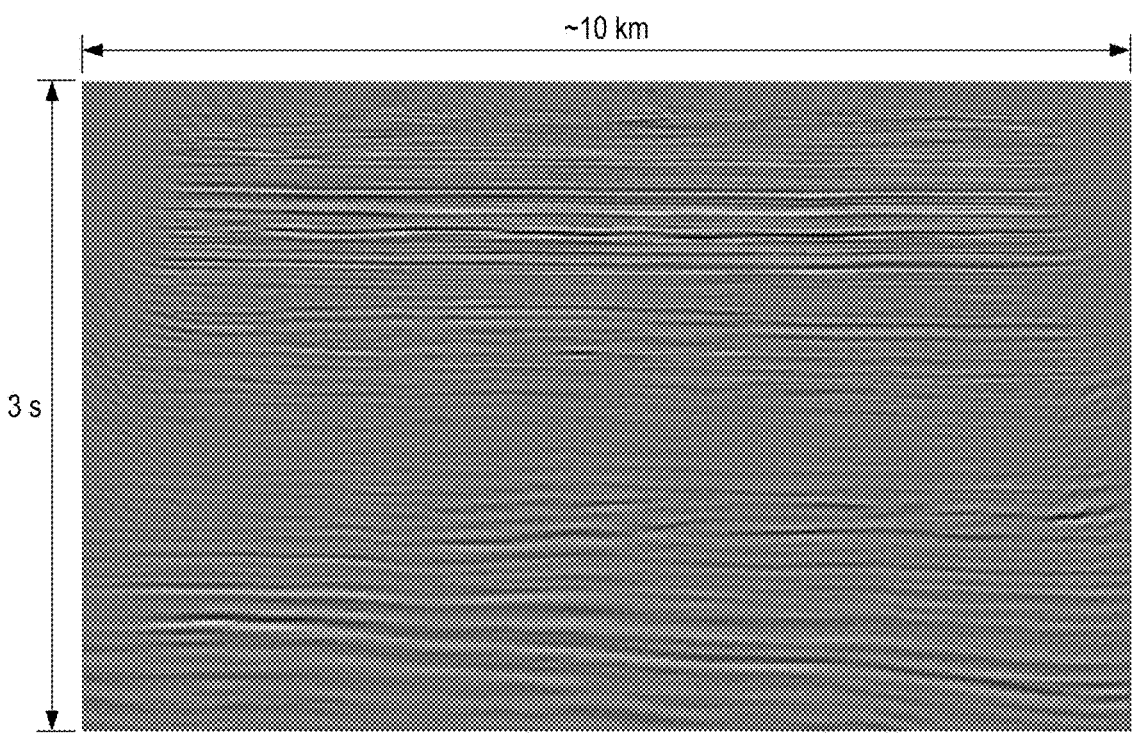
FIG. 18 illustrates a bandwidth-broadened image of the second inline.

FIG. 16A illustrates an input image of a second inline. FIG. 16B illustrates an image of a second inline with jitters removed. The jitters visible in FIG. 16A are removed using SVD. FIG. 17A illustrates a reconstructed increased-frequency image. The reconstructed image in FIG. 17A corresponds to the input post-stack time-domain image of FIG. 16A. FIG. 17B illustrates an image with structural artifacts removed. The structural artifacts present in FIG. 17A are removed using SVD. FIG. 18 illustrates a bandwidth-broadened image of the second inline. The images of FIGS. 16B and 17B are summed together via a weighting function in the frequency domain.

Figure 19:
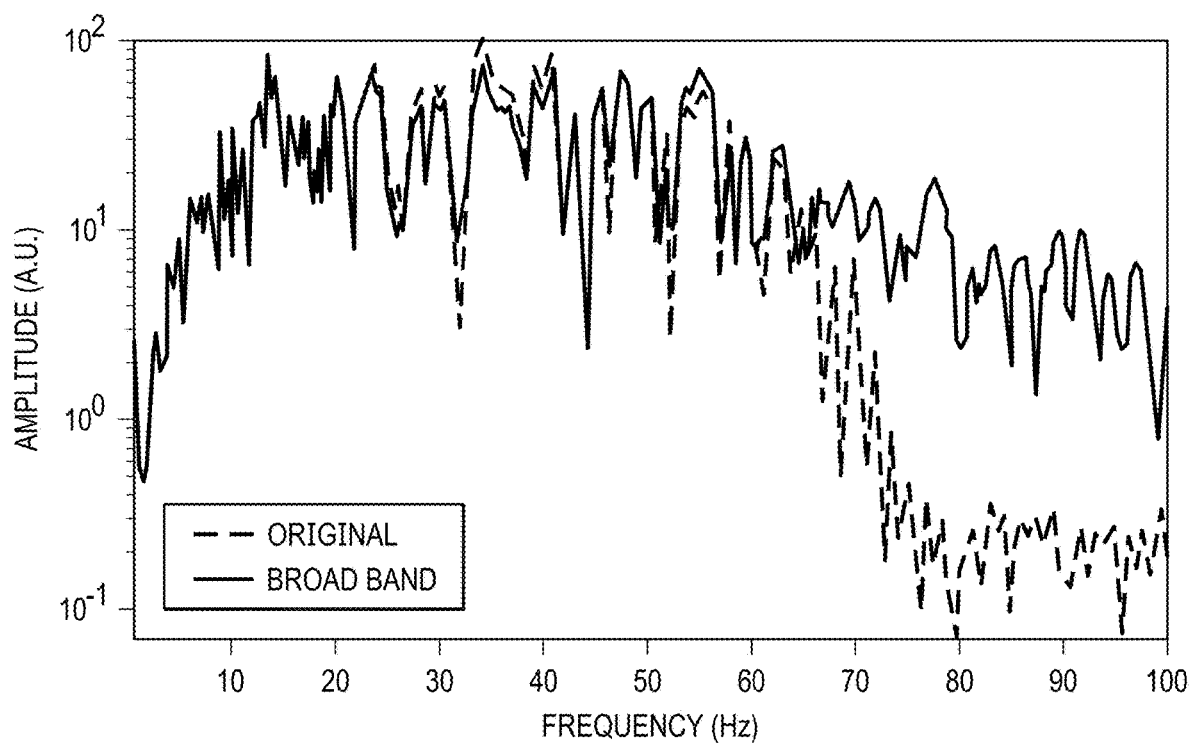
FIG. 19 illustrates spectra of an image before and after bandwidth enhancement.
Figure 20A:
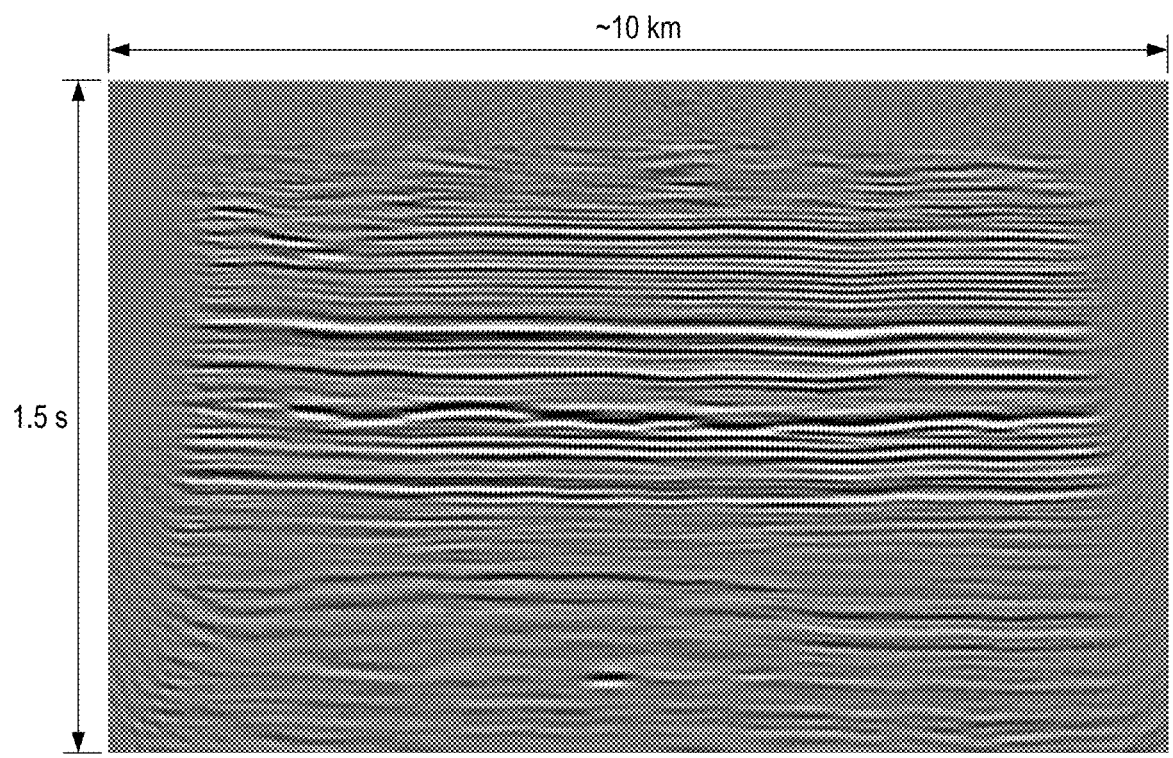
FIG. 20A illustrates an effect of bandwidth broadening.
Figure 20B:
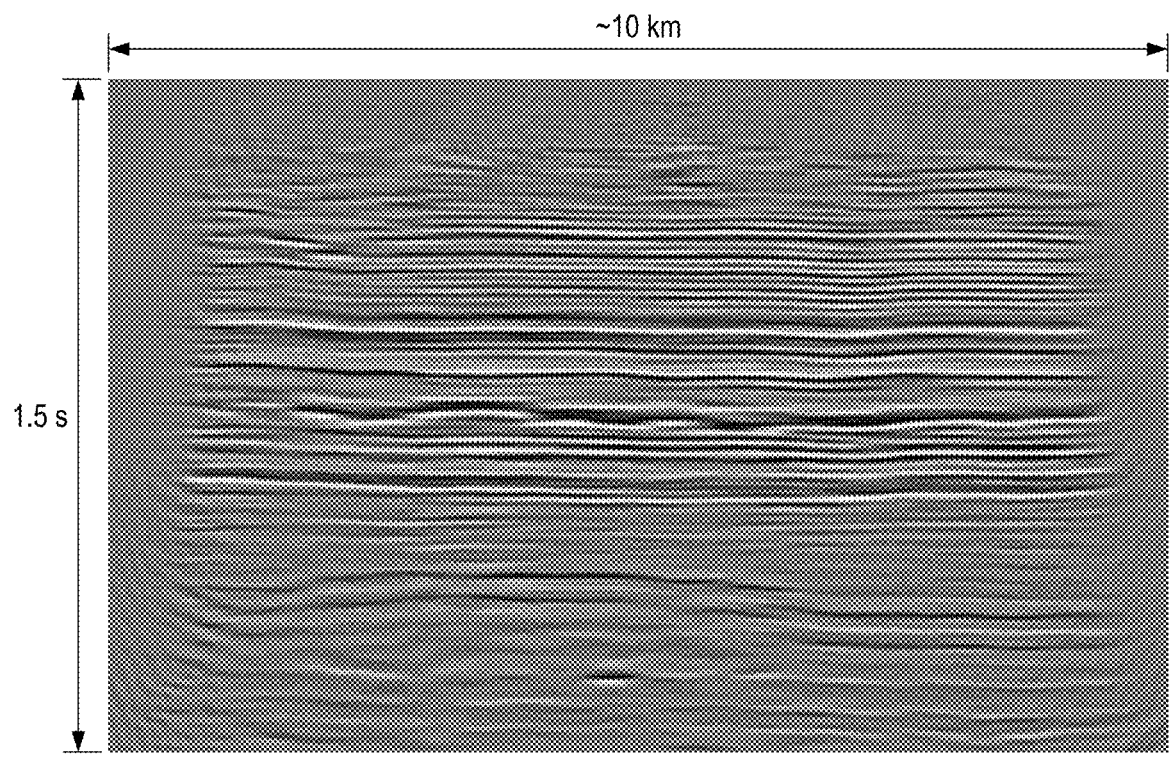
FIG. 20B illustrates an effect of bandwidth broadening.
Figure 21:
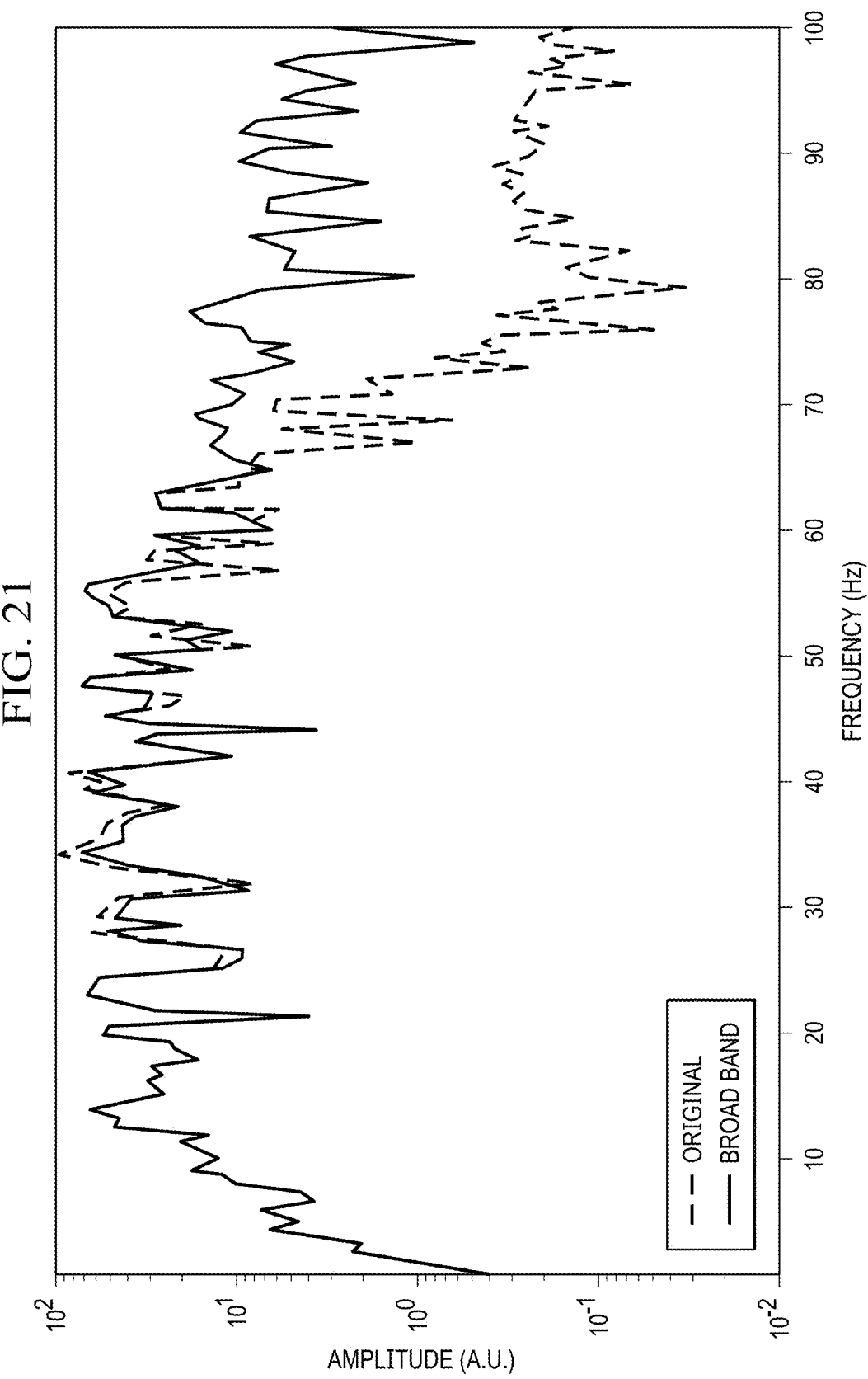
FIG. 21 illustrates spectra of multiple images.
Figure 22A:
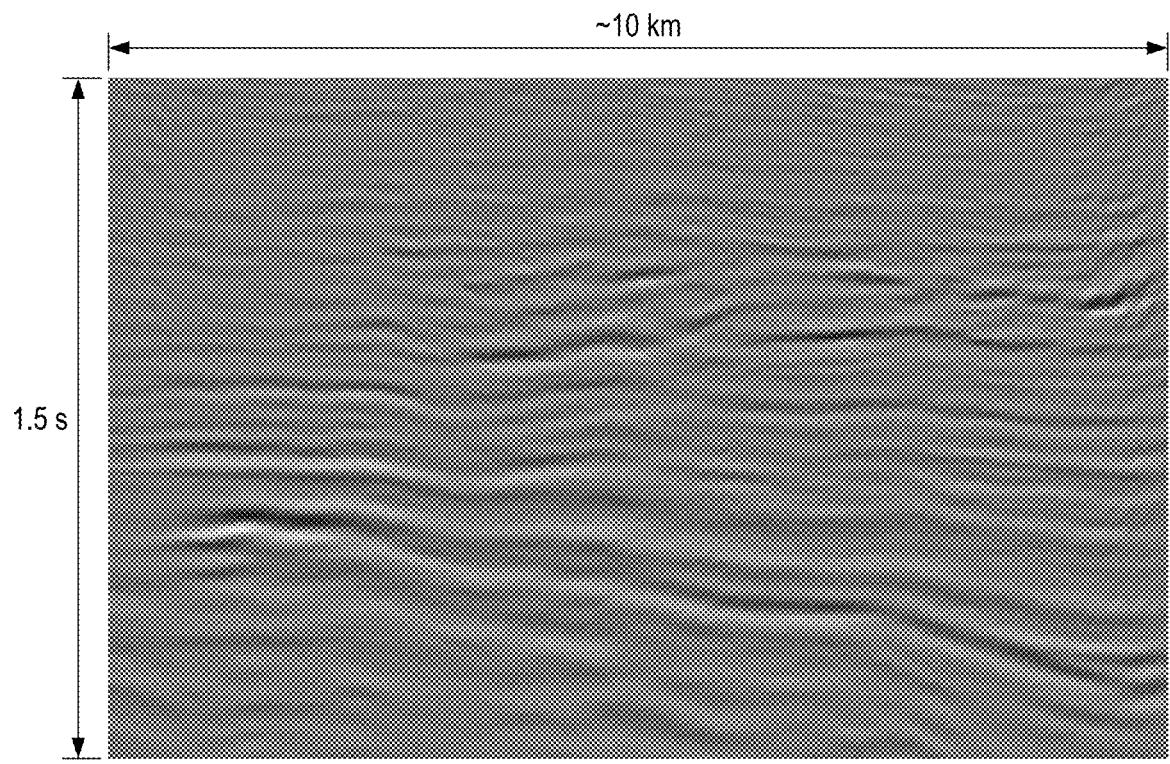
FIG. 22A illustrates a portion of the second inline with jitters removed.
Figure 22B:
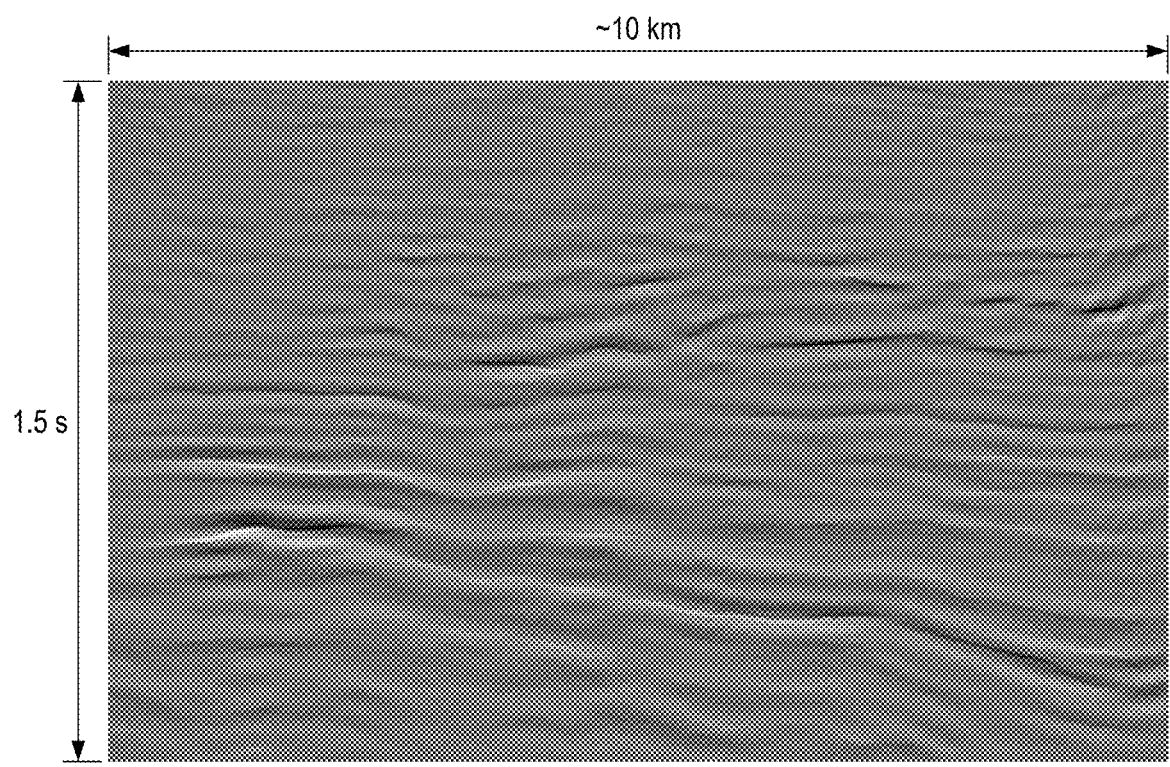
FIG. 22B illustrates a portion of a bandwidth-broadened image of the second inline.
Figure 23:
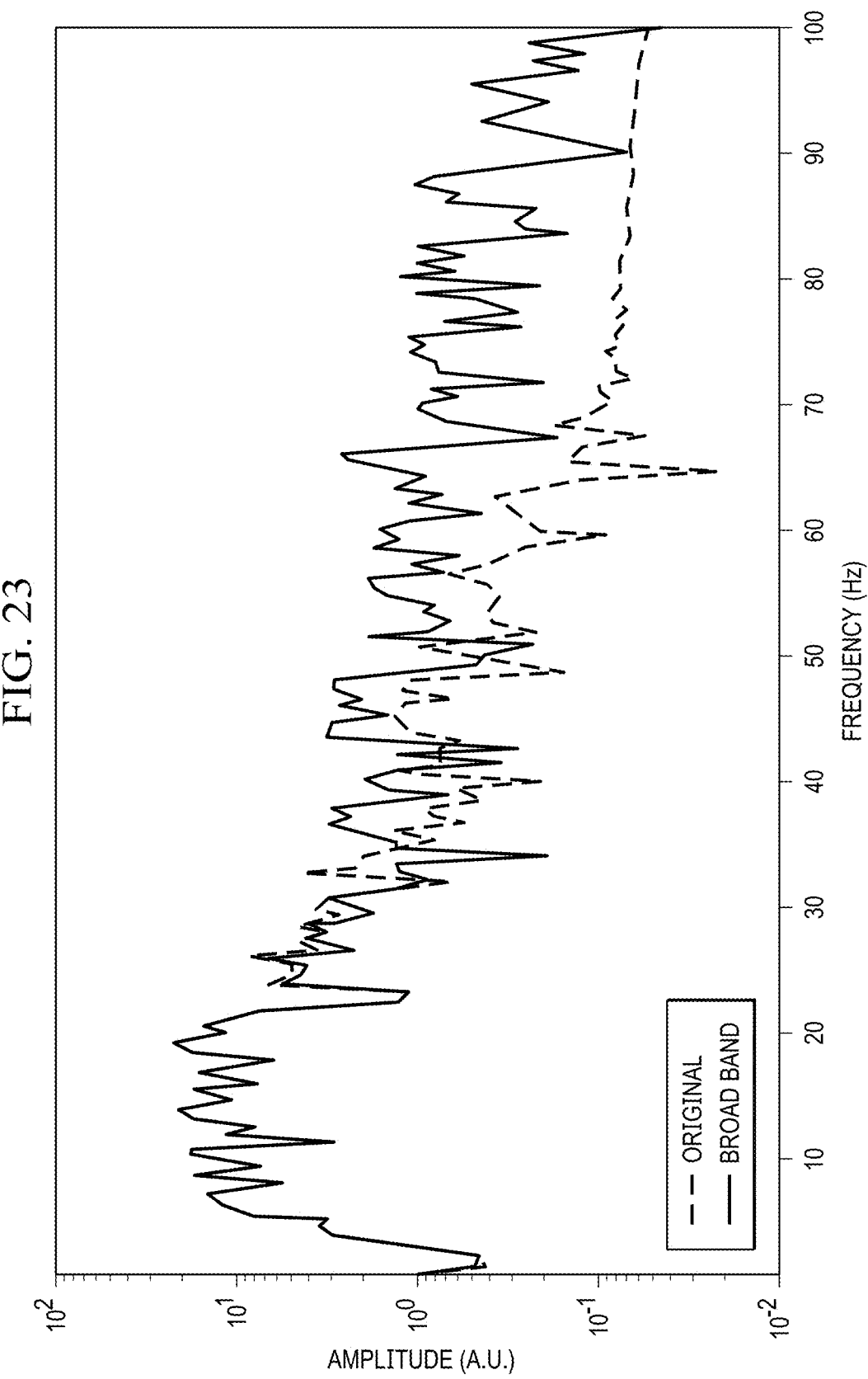
FIG. 23 illustrates spectra of multiple images.

FIG. 19 illustrates spectra of an image before and after bandwidth enhancement. FIG. 20A illustrates an effect of bandwidth broadening. The first half portion (the first 1.5 s) of FIG. 16B is shown in FIG. 20A. FIG. 20B illustrates an effect of bandwidth broadening. FIG. 20B shows the first half portion of FIG. 18. FIG. 21 illustrates spectra of multiple images. FIG. 21 shows the spectra of the images of FIGS. 20A and 20B, illustrating the effect of bandwidth broadening. FIG. 22A illustrates a portion of the second inline with jitters removed. FIG. 22A shows the last half portion (the last 1.5 s) of FIG. 16B. FIG. 22B illustrates a portion of a bandwidth-broadened image of the second inline. FIG. 22B shows the last half portion (the last 1.5 s) of FIG. 18. FIG. 23 illustrates spectra of multiple images. FIG. 23 shows the spectra of the images in FIGS. 22A and 22B, illustrating the effect of bandwidth broadening.

Figure 24:
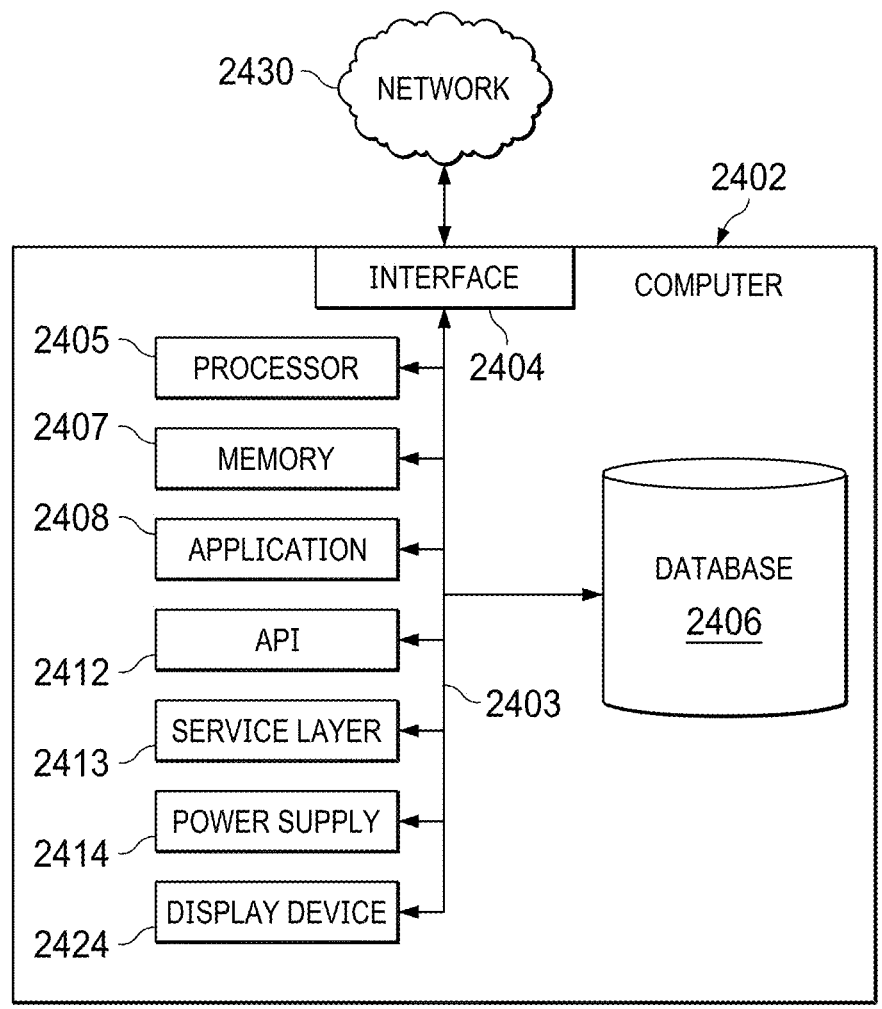
FIG. 24 illustrates a computer system.

FIG. 24 illustrates a computer system for broadening a spectrum of a post-stack time domain image. The methods described can be performed in any sequence and in any combination, and the components of respective embodiments can be combined in any manner. The machine-implemented operations described above can be implemented by the computer system in FIG. 24 that includes programmable circuitry configured by software or firmware, or a special-purpose circuit, or a combination of such forms. Such a special-purpose circuit can be in the form of, for example, one or more application-specific integrated circuits (ASICs), programmable logic devices (PLDs), field-programmable gate arrays (FPGAs), or system-on-a-chip systems (SOCs).

Software or firmware to implement the techniques introduced here can be stored on a non-transitory machine-readable storage medium (for example, memory 2407) and executed by one or more general-purpose or special-purpose programmable microprocessors (for example, processor 2405). A machine-readable medium, as the term is used, includes any mechanism that can store information in a form accessible by a machine (a machine can be, for example, a computer, network device, cellular phone, personal digital assistant (PDA), manufacturing tool, or any device with one or more processors). For example, a machine-accessible medium includes recordable or non-recordable media (RAM or ROM, magnetic disk storage media, optical storage media, or flash memory devices).

The computer system can include a display device 2424, such as a computer monitor, a liquid crystal display (LCD), an organic light-emitting diode (OLED), or an active-matrix organic light-emitting diode (AMOLED) to display results of the processes disclosed.

The term "logic," as used herein, means: i) special-purpose hardwired circuitry, such as one or more application-specific integrated circuits (ASICs), programmable logic devices (PLDs), field programmable gate arrays (FPGAs), or other similar device(s); ii) programmable circuitry programmed with software and/or firmware, such as one or more programmed general-purpose microprocessors, digital signal processors (DSPs) or microcontrollers, system-on-a-chip systems (SOCs), or other similar device(s); or iii) a combination of the forms mentioned in i) and ii).

The illustrated computer 2402 is intended to encompass any computing device such as a server, a desktop computer, a laptop or notebook computer, a wireless data port, a smart phone, a personal data assistant (PDA), a tablet computing device, or one or more processors within these devices, including physical instances, virtual instances, or both. The computer 2402 can include input devices such as keypads, keyboards, and touch screens that can accept user information. Also, the computer 2402 can include output display devices 2424 that can convey information associated with the operation of the computer 2402. The information can include digital data, visual data, audio information, or a combination of information. The information can be presented in a graphical user interface (UI) (or GUI).

The computer 2402 can serve in a role as a client, a network component, a server, a database, a persistency, or components of a computer system for performing the subject matter described in the present disclosure. The illustrated computer 2402 is communicably coupled with a network 2430. In some implementations, one or more components of the computer 2402 can be configured to operate within different environments, including cloud-computing-based environments, local environments, global environments, and combinations of environments.

At atop level, the computer 2402 is an electronic computing device operable to receive, transmit, process, store, and manage data and information associated with the described subject matter. According to some implementations, the computer 2402 can also include, or be communicably coupled with, an application server, an email server, a web server, a caching server, a streaming data server, or a combination of servers.

The computer 2402 can receive requests over network 2430 from a client application (for example, executing on another computer 2402). The computer 2402 can respond to the received requests by processing the received requests using software applications. Requests can also be sent to the computer 2402 from internal users (for example, from a command console), external (or third) parties, automated applications, entities, individuals, systems, and computers.

Each of the components of the computer 2402 can communicate using a system bus 2403. In some implementations, any or all of the components of the computer 2402, including hardware or software components, can interface with each other or the interface 304 (or a combination of both) over the system bus 2403. Interfaces can use an application programming interface (API) 2412, a service layer 2413, or a combination of the API 2412 and service layer 2413. The API 2412 can include specifications for routines, data structures, and object classes. The API 2412 can be either computer-language independent or dependent. The API 2412 can refer to a complete interface, a single function, or a set of APIs.

The service layer 2413 can provide software services to the computer 2402 and other components (whether illustrated or not) that are communicably coupled to the computer 2402. The functionality of the computer 2402 can be accessible for all service consumers using this service layer. Software services, such as those provided by the service layer 2413, can provide reusable, defined functionalities through a defined interface. For example, the interface can be software written in JAVA, C++, or a language providing data in extensible markup language (XML) format. While illustrated as an integrated component of the computer 2402, in alternative implementations, the API 2412 or the service layer 2413 can be stand-alone components in relation to other components of the computer 2402 and other components communicably coupled to the computer 2402. Moreover, any or all parts of the API 2412 or the service layer 2413 can be implemented as child or sub-modules of another software module, enterprise application, or hardware module without departing from the scope of the present disclosure.

The computer 2402 includes an interface 2404. Although illustrated as a single interface 2404 in FIG. 24, two or more interfaces 2404 can be used according to particular needs, desires, or particular implementations of the computer 2402 and the described functionality. The interface 2404 can be used by the computer 2402 for communicating with other systems that are connected to the network 2430 (whether illustrated or not) in a distributed environment. Generally, the interface 2404 can include, or be implemented using, logic encoded in software or hardware (or a combination of software and hardware) operable to communicate with the network 2430. More specifically, the interface 2404 can include software supporting one or more communication protocols associated with communications. As such, the network 2430 or the interface's hardware can be operable to communicate physical signals within and outside of the illustrated computer 2402.

The computer 2402 includes a processor 2405. Although illustrated as a single processor 2405 in FIG. 24, two or more processors 2405 can be used according to particular needs, desires, or particular implementations of the computer 2402 and the described functionality. Generally, the processor 2405 can execute instructions and can manipulate data to perform the operations of the computer 2402, including operations using algorithms, methods, functions, processes, flows, and procedures as described in the present disclosure.

The computer 2402 also includes a database 2406 that can hold data for the computer 2402 and other components connected to the network 2430 (whether illustrated or not). For example, database 2406 can be an in-memory, conventional, or a database storing data consistent with the present disclosure. In some implementations, database 2406 can be a combination of two or more different database types (for example, hybrid in-memory and conventional databases) according to particular needs, desires, or particular implementations of the computer 2402 and the described functionality. Although illustrated as a single database 2406 in FIG. 24, two or more databases (of the same, different, or combination of types) can be used according to particular needs, desires, or particular implementations of the computer 2402 and the described functionality. While database 2406 is illustrated as an internal component of the computer 2402, in alternative implementations, database 2406 can be external to the computer 2402.

The computer 2402 also includes a memory 2407 that can hold data for the computer 2402 or a combination of components connected to the network 2430 (whether illustrated or not). Memory 2407 can store any data consistent with the present disclosure. In some implementations, memory 2407 can be a combination of two or more different types of memory (for example, a combination of semiconductor and magnetic storage) according to particular needs, desires, or particular implementations of the computer 2402 and the described functionality. Although illustrated as a single memory 2407 in FIG. 24, two or more memories 2407 (of the same, different, or combination of types) can be used according to particular needs, desires, or particular implementations of the computer 2402 and the described functionality. While memory 2407 is illustrated as an internal component of the computer 2402, in alternative implementations, memory 2407 can be external to the computer 2402.

The application 2408 can be an algorithmic software engine providing functionality according to particular needs, desires, or particular implementations of the computer 2402 and the described functionality. For example, application 2408 can serve as one or more components, modules, or applications. Further, although illustrated as a single application 2408, the application 2408 can be implemented as multiple applications 2408 on the computer 2402. In addition, although illustrated as internal to the computer 2402, in alternative implementations, the application 2408 can be external to the computer 2402.

The computer 2402 can also include a power supply 2414. The power supply 2414 can include a rechargeable or non-rechargeable battery that can be configured to be either user- or non-user-replaceable. In some implementations, the power supply 2414 can include power-conversion and management circuits, including recharging, standby, and power management functionalities. In some implementations, the power-supply 2414 can include a power plug to allow the computer 2402 to be plugged into a wall socket or a power source to, for example, power the computer 2402 or recharge a rechargeable battery.

There can be any number of computers 2402 associated with, or external to, a computer system containing computer 2402, with each computer 2402 communicating over network 2430. Further, the terms client, user, and other appropriate terminology can be used interchangeably, as appropriate, without departing from the scope of the present disclosure. Moreover, the present disclosure contemplates that many users can use one computer 2402 and one user can use multiple computers 2402.

What is claimed is:

1. A method comprising:
receiving, by a computer system, a post-stack time-domain image having a first spectrum and representing one or more subsurface structures;
reconstructing, by the computer system, an increased-frequency version of the post-stack time-domain image using L0-constrained inversion and a least-squares mismatch ratio, the increased-frequency version of the post-stack time-domain image comprising structural artifacts;
removing, by the computer system, the structural artifacts from the increased-frequency version of the post-stack time-domain image using singular value decomposition (SVD);
combining, by the computer system, the increased-frequency version of the post-stack time-domain image with the post-stack time-domain image using a weighting function; and
generating, by the computer system, a combined version of the increased-frequency version of the post-stack time-domain image and the post-stack time-domain image, the combined version representing the one or more subsurface structures and having a second spectrum broader than the first spectrum.

2. The method of claim 1, wherein the L0-constrained inversion is based on a dictionary comprising phase-rotated wavelets.

3. The method of claim 2, wherein the phase-rotated wavelets are derived from a Ricker wavelet and a Klauder wavelet.

4. The method of claim 1, wherein the reconstructing of the increased-frequency version comprises performing, by the computer system, the L0-constrained inversion using a greedy algorithm.

5. The method of claim 1, further comprising:
prior to reconstructing the increased-frequency version of the post-stack time-domain image, removing, by the computer system, jitters from the post-stack time-domain image using SVD.

6. The method of claim 1, wherein the post-stack time-domain image comprises a plurality of traces and reconstructing the increased-frequency version of the post-stack time-domain image comprises:
grouping, by the computer system, each trace of the plurality of traces with neighboring traces of the trace into a trace group; and
selecting, by the computer system, an atom associated with a decrease in a residual of the group trace to provide the increased-frequency version of the post-stack time-domain image.

7. The method of claim 6, further comprising subtracting, by the computer system, a contribution of the atom from each trace of the trace group.

8. A non-transitory computer-readable storage medium storing instructions executable by one or more computer processors, the instructions when executed by the one or more computer processors cause the one or more computer processors to:
receive a post-stack time-domain image having a first spectrum and representing one or more subsurface structures;
reconstruct an increased-frequency version of the post-stack time-domain image using L0-constrained inversion and a least-squares mismatch ratio, the increased-frequency version of the post-stack time-domain image comprising structural artifacts;
remove the structural artifacts from the increased-frequency version of the post-stack time-domain image using singular value decomposition (SVD);
combine the increased-frequency version of the post-stack time-domain image with the post-stack time-domain image using a weighting function; and
generate a combined version of the increased-frequency version of the post-stack time-domain image and the post-stack time-domain image, the combined version representing the one or more subsurface structures and having a second spectrum broader than the first spectrum.

9. The non-transitory computer-readable storage medium of claim 8, wherein the L0-constrained inversion is based on a dictionary comprising phase-rotated wavelets.

10. The non-transitory computer-readable storage medium of claim 9, wherein the phase-rotated wavelets are derived from a Ricker wavelet and a Klauder wavelet.

11. The non-transitory computer-readable storage medium of claim 8, wherein reconstructing of the increased-frequency version comprises performing the L0-constrained inversion using a greedy algorithm.

12. The non-transitory computer-readable storage medium of claim 8, wherein the instructions further causing the one or more computer processors to:
prior to reconstructing the increased-frequency version of the post-stack time-domain image, remove jitters from the post-stack time-domain image using SVD.

13. The non-transitory computer-readable storage medium of claim 8, wherein the post-stack time-domain image comprises a plurality of traces and reconstructing the increased-frequency version of the post-stack time-domain image comprises:
grouping each trace of the plurality of traces with neighboring traces of the trace into a trace group; and
selecting an atom associated with a decrease in a residual of the group trace to provide the increased-frequency version of the post-stack time-domain image.

14. The non-transitory computer-readable storage medium of claim 13, the instructions further causing the one or more computer processors to subtract a contribution of the atom from each trace of the group trace.

15. A computer system comprising:
one or more computer processors; and
a non-transitory computer-readable storage medium storing instructions executable by the one or more computer processors, the instructions when executed by the one or more computer processors cause the one or more computer processors to:
receive a post-stack time-domain image having a first spectrum and representing one or more subsurface structures;
reconstruct an increased-frequency version of the post-stack time-domain image using L0-constrained inversion and a least-squares mismatch ratio, the increased-frequency version of the post-stack time-domain image comprising structural artifacts;
remove the structural artifacts from the increased-frequency version of the post-stack time-domain image using singular value decomposition (SVD);

combine the increased-frequency version of the post-stack time-domain image with the post-stack time-domain image using a weighting function; and generate a combined version of the increased-frequency version of the post-stack time-domain image and the post-stack time-domain image, the combined version representing the one or more subsurface structures and having a second spectrum broader than the first spectrum.

16. The computer system of claim 15, wherein the L0-constrained inversion is based on a dictionary comprising phase-rotated wavelets.

17. The computer system of claim 16, wherein the phase-rotated wavelets are derived from a Ricker wavelet and a Klauder wavelet.

18. The computer system of claim 15, wherein reconstructing of the increased-frequency version comprises performing the L0-constrained inversion using a greedy algorithm.

19. The computer system of claim 15, wherein the instructions further causing the one or more computer processors to:

prior to reconstructing the increased-frequency version of the post-stack time-domain image, remove jitters from the post-stack time-domain image using SVD.

20. The computer system of claim 15, wherein the post-stack time-domain image comprises a plurality of traces and reconstructing the increased-frequency version of the post-stack time-domain image comprises:

grouping each trace of the plurality of traces with neighboring traces of the trace into a trace group; and selecting an atom associated with a decrease in a residual of the group trace to provide the increased-frequency version of the post-stack time-domain image.

\* \* \* \* \*